(12) United States Patent
Davidson

(10) Patent No.: US 8,478,049 B2
(45) Date of Patent: Jul. 2, 2013

(54) METHOD FOR FIXED-ROTATION AND ROTATION-INDEPENDENT IMAGE CORRELATION

(75) Inventor: Douglas Davidson, Saline, MI (US)

(73) Assignee: Coherix, Inc., Ann Arbor, MI (US)

( * ) Notice: Subject to any disclaimer, the term of this patent is extended or adjusted under 35 U.S.C. 154(b) by 49 days.

(21) Appl. No.: 13/265,426

(22) PCT Filed: Apr. 29, 2010

(86) PCT No.: PCT/US2010/033056
§ 371 (c)(1),
(2), (4) Date: Nov. 29, 2011

(87) PCT Pub. No.: WO2010/127179
PCT Pub. Date: Nov. 4, 2010

(65) Prior Publication Data
US 2012/0163721 A1    Jun. 28, 2012

Related U.S. Application Data

(60) Provisional application No. 61/173,852, filed on Apr. 29, 2009.

(51) Int. Cl.
*G06K 9/48* (2006.01)
*G06K 9/46* (2006.01)

(52) U.S. Cl.
USPC ........... 382/199; 382/195; 382/162; 382/167; 382/166

(58) Field of Classification Search
USPC .. 382/190, 195, 199, 162, 166, 167; 358/518, 358/520, 521, 522, 523
See application file for complete search history.

(56) References Cited

U.S. PATENT DOCUMENTS

| | | | | |
|---|---|---|---|---|
| 6,064,763 A | * | 5/2000 | Maltsev | 382/183 |
| 2005/0185822 A1 | * | 8/2005 | Slaski | 382/103 |
| 2007/0104358 A1 | * | 5/2007 | Komatsu | 382/151 |
| 2010/0098293 A1 | * | 4/2010 | Chandraker et al. | 382/103 |
| 2010/0104199 A1 | * | 4/2010 | Zhang et al. | 382/199 |

* cited by examiner

*Primary Examiner* — Ali Bayat
(74) *Attorney, Agent, or Firm* — Jeffrey Schox

(57) ABSTRACT

A circlet is defined as a compact angle representation expressing, at a given pixel comprised in the first image, the direction of change of pixel intensity. A method of locating a feature of interest includes the steps of: acquiring a first image of a feature of interest to a user; generating a learned circlet image from the first image; saving one or more sets of learned circlets corresponding to one or more selected probes; acquiring a second image of the feature of interest; generating a target circlet image from the second image; and correlating the learned circlet image and the target circlet image.

25 Claims, 19 Drawing Sheets

PROBE SET 1
POSITION 3

PROBE SET 1
POSITION 4

PROBE SET 2
POSITION 3

PROBE SET 2
POSITION 4

PROBE SET 3
POSITION 3

PROBE SET 3
POSITION 4

METHOD FOR FIXED-ROTATION AND ROTATION-INDEPENDENT IMAGE CORRELATION

CROSS-REFERENCE TO RELATED APPLICATION

This application claims the benefit of U.S. Provisional Application No. 61/173,852, filed 29 Apr. 2009, which is incorporated in its entirety by this reference.

TECHNICAL FIELD

This invention relates generally to the image processing and computer vision fields, and more specifically to a new and useful method for fixed rotation and rotation-independent image correlation in the image processing and computer vision fields.

BACKGROUND

Traditional correlation algorithms are relatively fast and robust. One example of correlation algorithms is the basic Vector Correlation algorithm described in U.S. Pat. No. 6,023,530, which is hereby incorporated in its entirety by this reference. However, traditional correlation algorithms (including the basic Vector Correlation algorithm) have the shortcomings of lacking rotation-independence and of lacking scale-independence. Geometric pattern location algorithms may be rotation-independent and may be scale-independent. However, geometric pattern location algorithms have the shortcomings of lacking the relative speed and robustness of traditional correlation algorithms. Thus, there is a need in the image processing and computer vision fields to create a new and useful method for fixed-rotation and rotation-independent image correlation. This invention provides such a new and useful method for rotation-independent image correlation.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
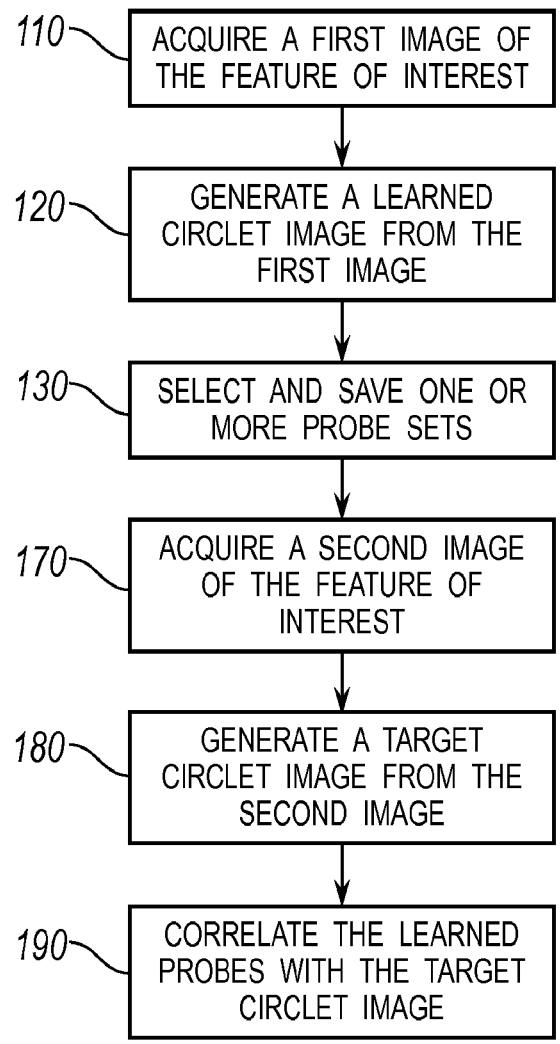
FIG. 1 is a flowchart illustrating a method of fixed-rotation and rotation-independent location of a feature of interest according to embodiments of the invention.

As shown in FIG. 1, the method 100 for fixed-rotation and rotation-independent image correlation preferably includes the steps of: acquiring a first image 110 of a feature of interest; generating a learned circlet image 120 from the first image; selecting and saving 130 one or more probe sets; acquiring a second image 170 of the feature of interest that is to be located; generating a target circlet image 180 from the second image; and correlating 190 the learned probes with the target circlet image. The basic Vector Correlation algorithm, which is a fixed-rotation algorithm, uses a set of probes (pattern) to correlate on North, South, East, and West binary edge directions. Although there are many variations of the basic Vector Correlation algorithm, they all correlate on some form of the gradient. The methods of the preferred embodiments, however, correlate on the angle of the gradient. This distinction has several advantages: (1) angles are independent of gradient strength (if there is no gradient then the angle is undefined, but if there is a gradient then the angle is unchanged regardless of the gradient magnitude), (2) angles have a distance from one another that is not based on strength, and (3) angles enable the ability to perform rotation-independent correlation.

Figure 2:
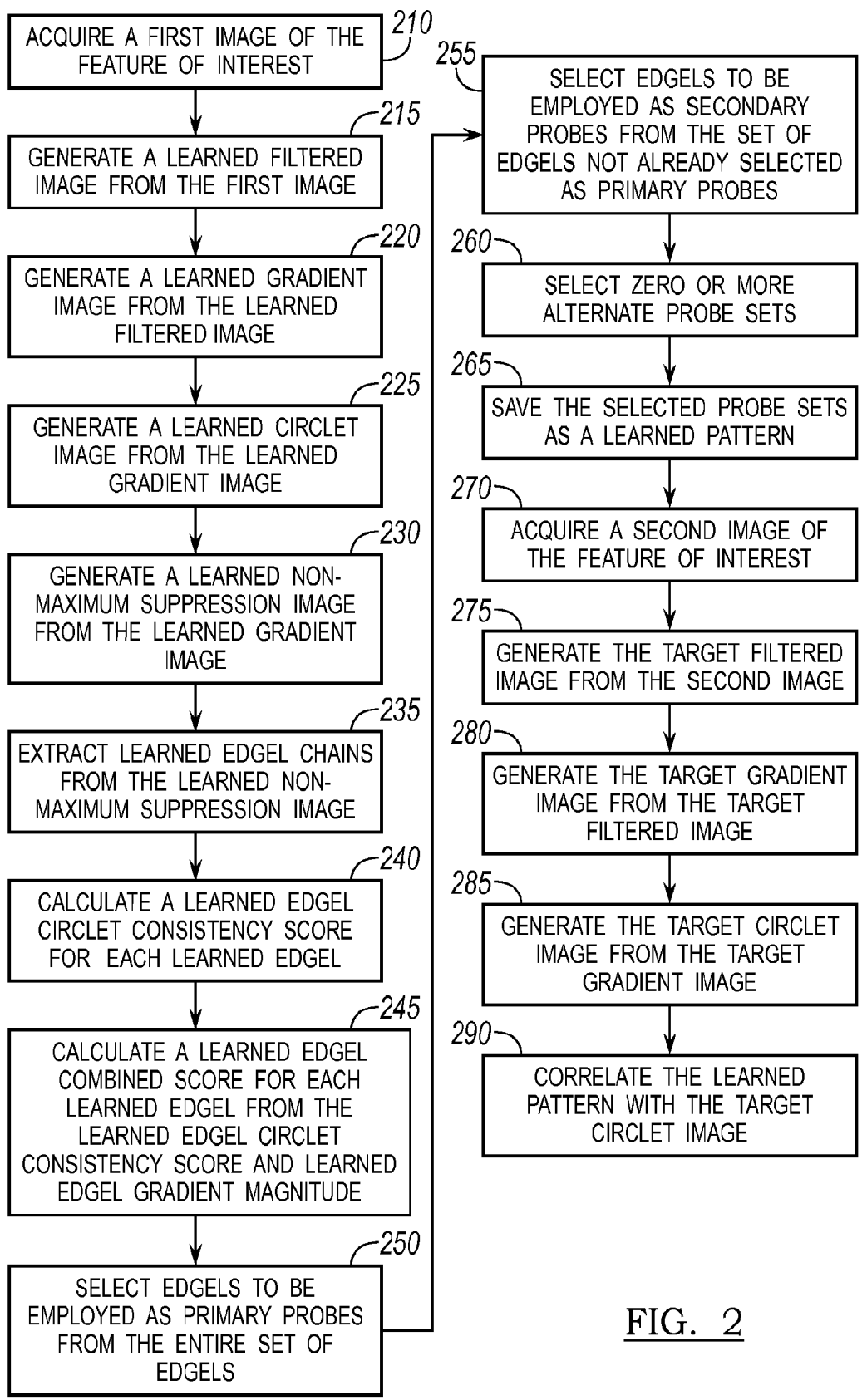
FIG. 2 is a more detailed flowchart illustrating a method of fixed-rotation and rotation-independent location of a feature of interest according to embodiments of the invention.
Figure 3A:
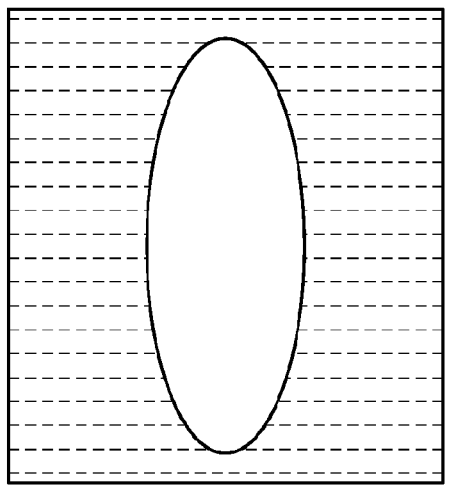
FIG. 3A shows an example of a raw image for a simple light ellipse on a dark background.
Figure 3B:
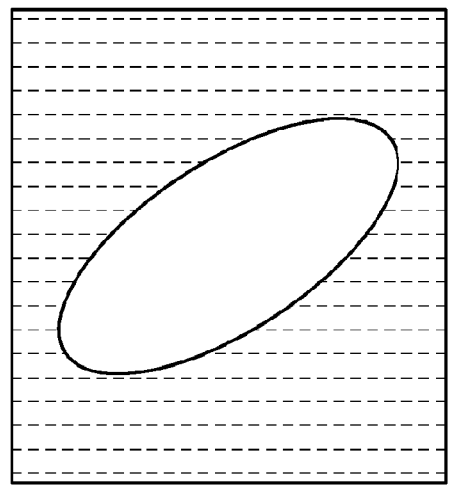
FIG. 3B shows the same ellipse rotated by 60 degrees.
Figure 3C:
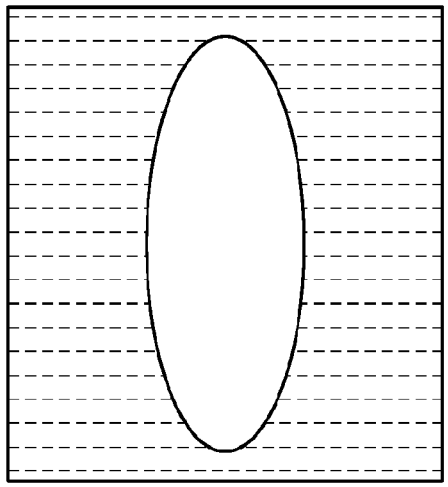
FIGS. 3C-3D depict the same images (respectively, FIGS. 3A and 3B) following a 3×3 average box filter operation.
Figure 3D:
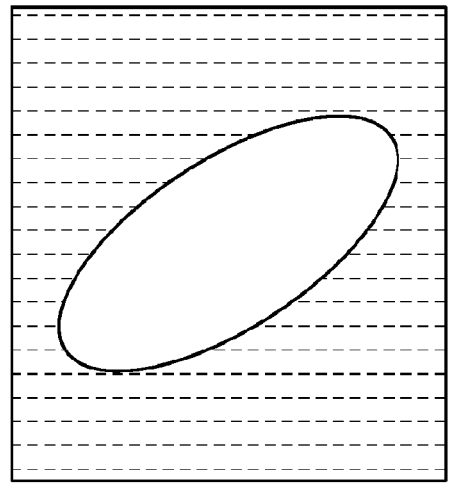
Figure 3E:
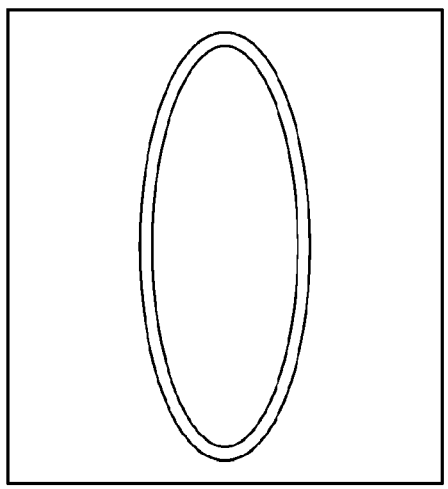
FIGS. 3E-3F depict gradient images corresponding to the same filtered images (respectively, FIGS. 3C and 3D)
Figure 3F:
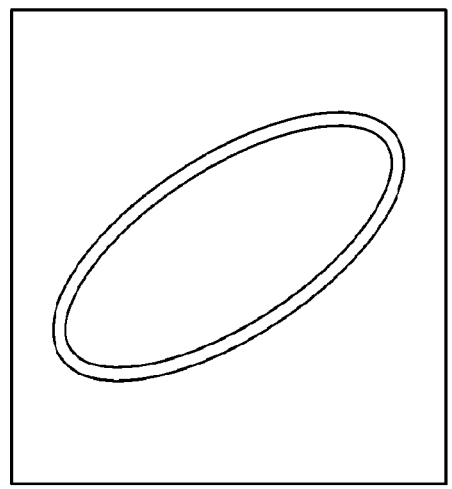
Figure 3G:
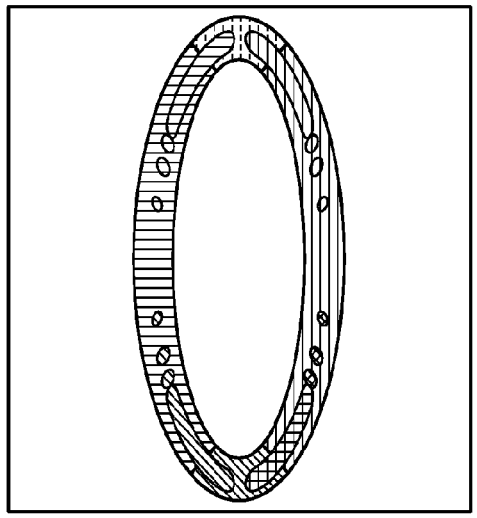
FIGS. 3G-3H depict circlet images respectively corresponding to FIGS. 3E and 3F using the color representations listed in the below Table.
Figure 3H:
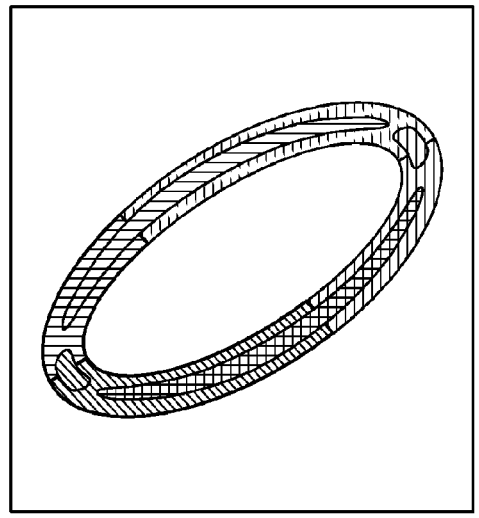
Figure 3I:
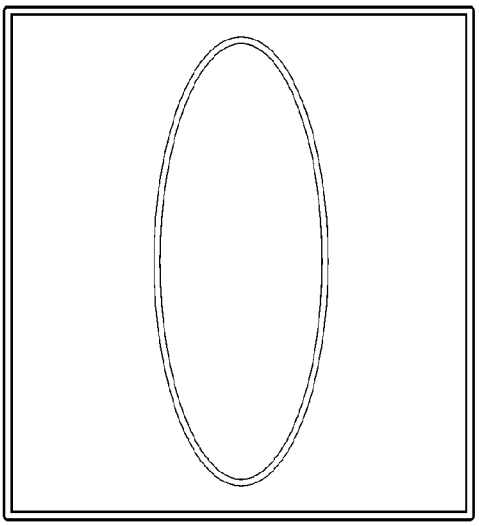
FIG. 3I depicts an example of a non-maximum suppression image including single-pixel-wide gradients generated in the process of learning a pattern and creating edgel chains.
Figure 3J:
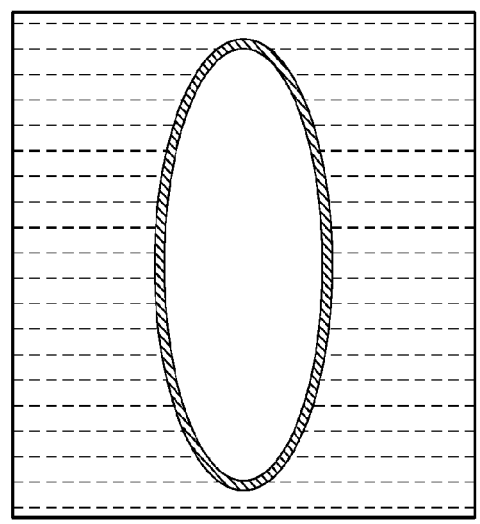
FIG. 3J depicts a list of available pattern edgels, indicated by the green pixels.
Figure 3K:
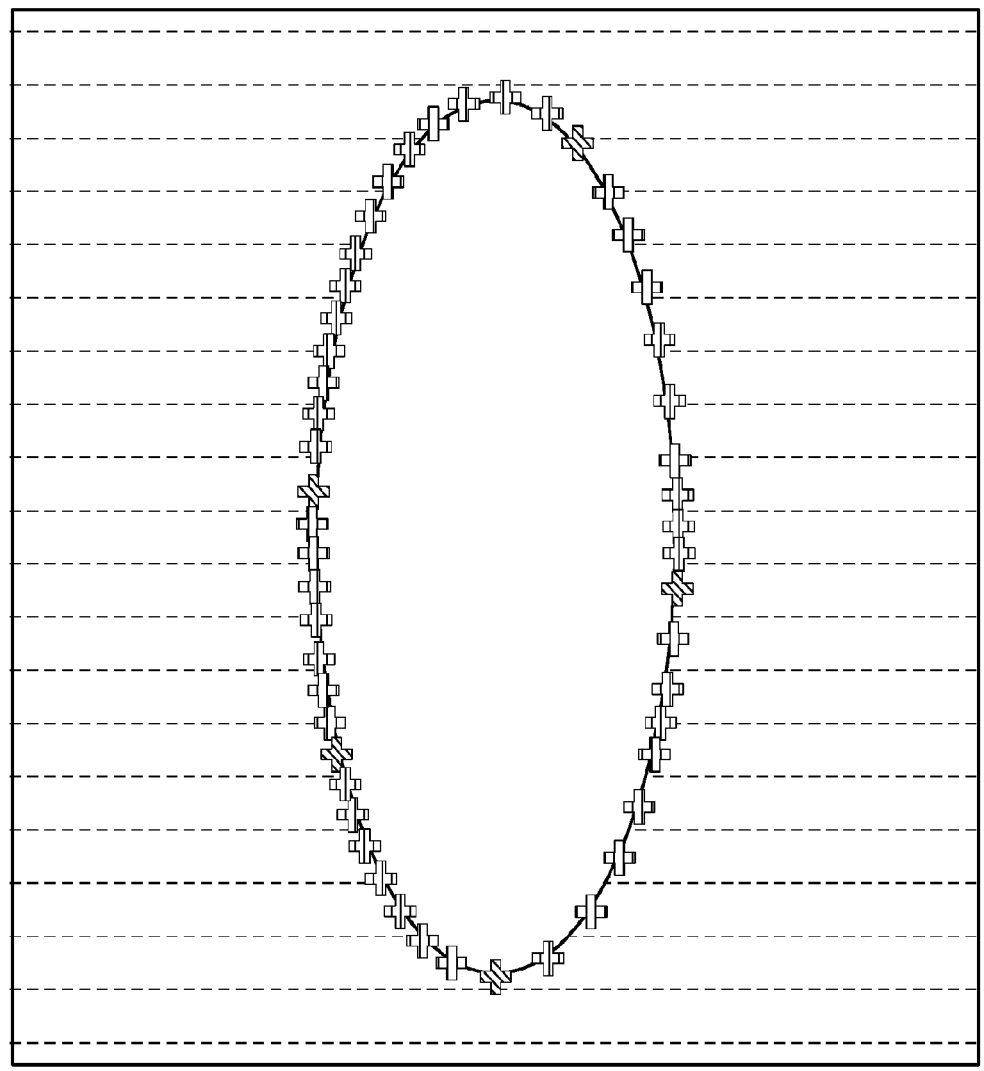
FIG. 3K depicts a probe set including primary and secondary probes. The primary probes are shown as green dots and the secondary probes are shown as red dots.
Figure 3L:
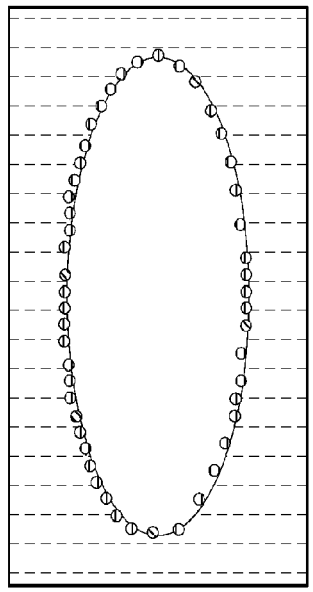
FIG. 3L shows the same probe set illustrated in FIG. 3K, FIGS. 3M-3Q show five possible alternate probe sets.
Figure 3M:
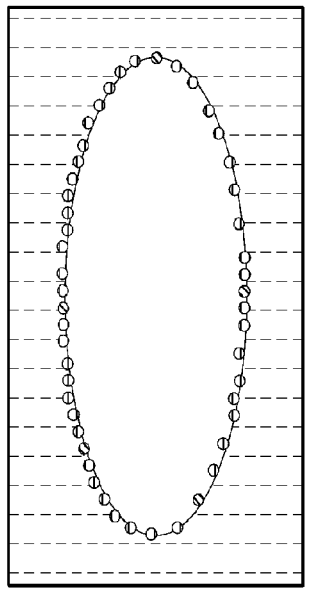
FIG. 3 is a set of illustrations showing examples of images obtained using embodiments of the invention, and more specifically.
FIG. 3R shows a probe set with each probe shown using the color of the corresponding circlet.
Figure 3N:
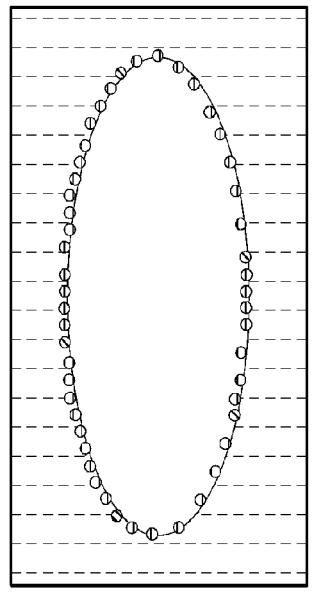
Figure 3O:
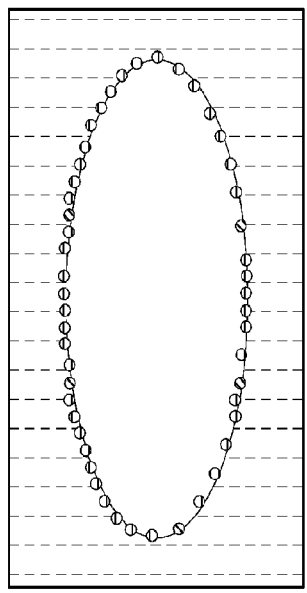
Figure 3P:
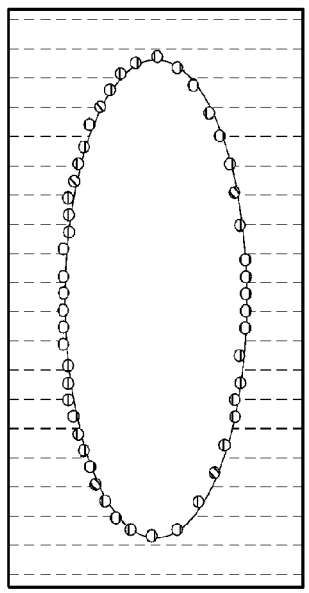
Figure 3Q:
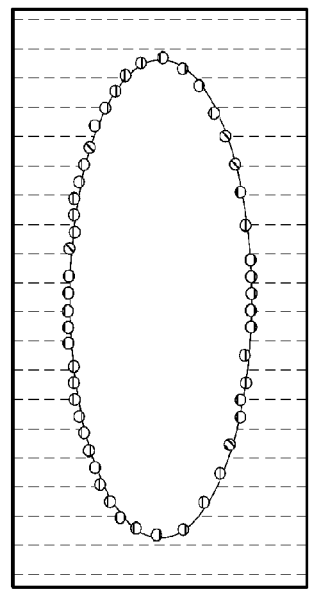
Figure 3R:
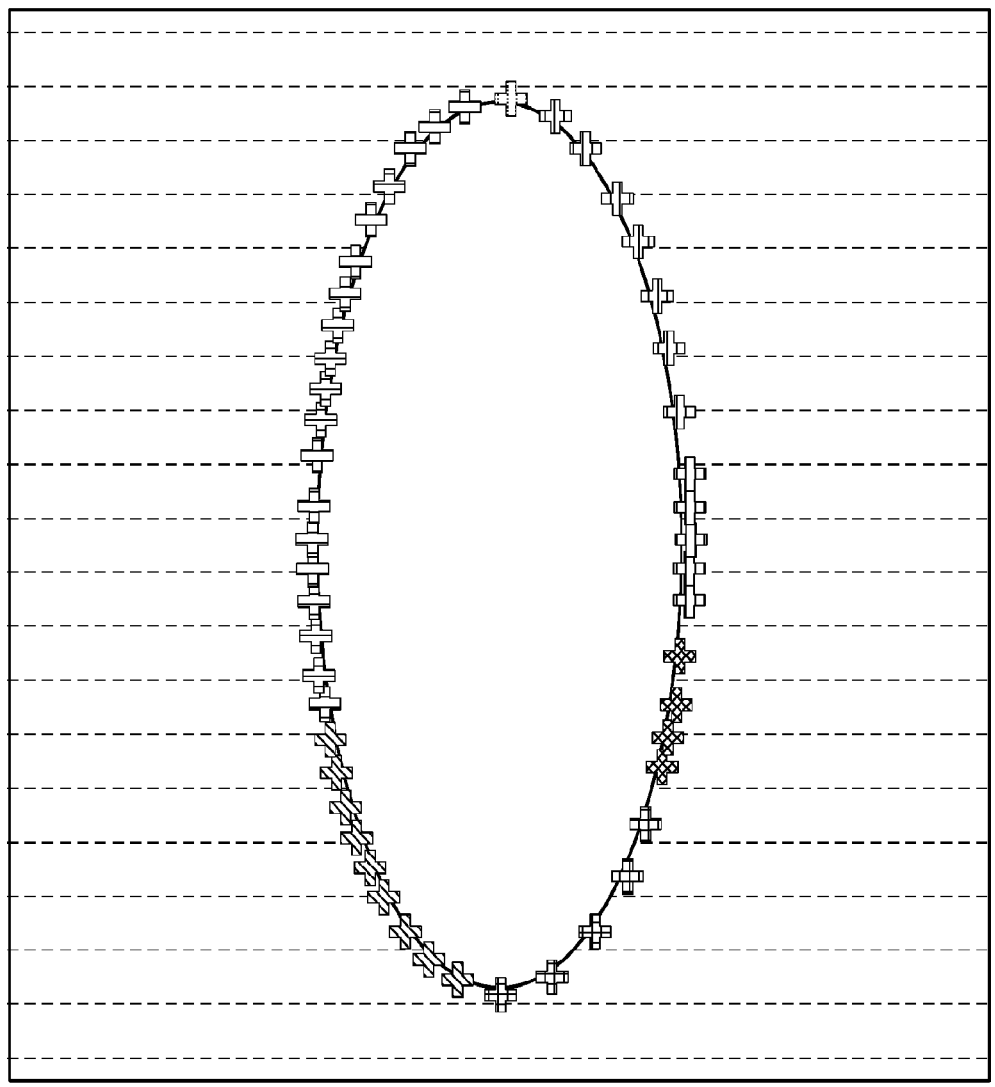

As shown in more detail in FIG. 2, the method 200 for fixed-rotation and rotation-independent image correlation preferably includes the steps of: acquiring a first image 210 of the feature of interest; generating a learned filtered image 215 from the first image; generating a learned gradient image 220 from the learned filtered image; generating a learned circlet image 225 from the learned gradient image; generating a learned non-maximum suppression image 230 from the learned circlet image; extracting edgel chains 235 from the learned non-maximum suppression image; calculating 240 a learned edgel circlet consistency score for each edgel; calculating a learned edgel combined score 245 for each learned edgel from the learned edgel circlet consistency score and the learned edgel gradient magnitude; selecting a set of edgels to be employed as the primary probes 250 from the entire set of edgels; selecting edgels to be employed as the secondary probes 255 from the set of edgels not already selected as primary probes; selecting 260 zero or more alternate probe sets; saving 265 the selected probe sets as a learned pattern; acquiring a second image 270 of the feature of interest; generating the target filtered image 275 from the second image; generating the target gradient image 280 from the target filtered image; and generating a target circlet image 285 from the target gradient image and using the learned pattern to correlate 290 with the target circlet image.

In step 210, an image is acquired of a feature of interest. The image may be acquired from any source such as a camera, a network (e.g., the Internet), a storage device, a scanner, or any other suitable device. A learned image may be comprised of an array of learned pixels, each having a position that may be expressed by two coordinates along two non-parallel axes. The two axes are preferably, though not necessarily, orthogonal. For example, a learned image may comprise a set of learned pixels, each learned pixel being characterized by a first coordinate along a first axis or other directional gradient, for example, a first coordinate x along the X axis, and a second coordinate along a second axis or other directional gradient, for example, a second coordinate y along the Y axis.

In step 215, filtering the learned image reduces random noise. This step may, for example, be carried out using a three by three averaging filter or a similar filter or according to any technique known in the art.

In step 220, a learned gradient image corresponding to the learned filtered image may be generated according to any computational or lookup technique known in the art such as, for example, the Sobel edge detection algorithm. For example, a learned gradient image may comprise a set of learned gradient pixels, each learned gradient pixel being characterized by a learned gradient first component along a first axis or other directional gradient, for example, a learned gradient component $G_{learned-x}$ along the X axis, and a learned gradient second component along a second axis or other directional gradient, for example, a learned gradient component $G_{learned-y}$ along the Y axis. Learned gradient $G_{learned}$ may be computed according to the following equation: $G_{learned}=\sqrt{(G^2_{learned-x}+G^2_{learned-y})}$. The calculation may be represented in pseudocode as follows: G=sqrt(Gx^2+Gy^2), where: G is the Calculated gradient magnitude, Gx is the Gradient along the X-Axis (or other directional gradient), and Gy is the Gradient along the Y-Axis (or other directional gradient)

Alternatively, the step 220 of obtaining a learned gradient image corresponding to the learned filtered image may be carried out using a lookup table, for example, a 64 kilobyte (KB) lookup table that may pre-calculate approximate gradient magnitude values. A larger or smaller lookup table could be employed to provide more or less output gradient magnitude value resolution or to accommodate more or less input gradient component value resolution. The gradient magnitude for each learned pixel may be extracted from the lookup table given the pixel's gradient components Gx and Gy. For example, the lookup table (LUT) may pre-calculate the gradient magnitude for each combination of the absolute value of the gradient components Gx and Gy: $G_{learned}$=LutGradient $[G_{learned-x-lookup}+G_{learned-y-lookup}]$.

Use of the lookup table may be represented as follows in pseudocode: BYTE m_uLutGradient[65536], G=m_uLutGradient[(abs(Gx)<<8)+abs(Gy)]. Appendix A contains the C++ code for calculation of the lookup table. Accordingly, the gradient magnitude values each can range from 0 to 255 for an 8-bit lookup table. Lookup tables incorporating more or less bits could be employed to provide more or less gradient magnitude value resolution. For example, if $G_{learned-x}$=−235 and $G_{learned-y}$=127, then $|G_{learned-x}|$=235 and $|G_{learned-y}|$=127, and calculation of the lookup table index proceeds as follows in pseudocode:

```
(abs(Gx) << 8) + abs(Gy)
(235 << 8) + 127
(235 * 256) + 127
60160 + 127
60287
```

The result is 60287.

A circlet is defined as an angle expressing the direction of change of intensity (or another attribute of interest), expressed in a compact angle representation. The compact angle representation maps the full 360-degree circle onto the numbers from 1 to 255 so that the angle may be represented in a single byte. The step 225 of generating a learned circlet image from the learned gradient image entails determining, for each learned pixel, the intensity gradient, taken at that learned pixel along the X and Y axes. The step 225 generates an array of learned circlets by determining the learned gradients $G_{learned-x}$ and $G_{learned-y}$, which may be calculated using the formulae: $G_{learned-x}=I_{learned-(x,y)}-I_{learned-(x-1,y)}$ and similarly $G_{learned-y}=I_{learned-(x,y)}-I_{learned-(x,y-1)}$. Alternatively, the following analogous set of formulae may be employed: $G_{learned-x}=I_{learned-(x+1,y)}-I_{learned-(x,y)}$ and similarly $G_{learned-y}=I_{learned-(x,y+1)}-I_{learned-(x,y)}$. Alternatively, the following set of formulae may be employed: $G_{learned-x}=(I_{learned-(x+1,y)}-I_{learned-(x-1,y)})/2$ and similarly $G_{learned-y}=(I_{learned-(x,y+1)}-I_{learned-(x,y-1)})/2$.

Regardless of the formula selected, learned circlet $C_{learned-(x,y)}$ may be computed for one or more learned image pixels, each having a position (x,y), according to the following formula: $C_{learned}=\{\Theta_{learned}*255/360\}+1$, where $C_{learned}$ is the learned circlet value, the learned gradient direction angle $\Theta_{learned}$=a tan 2 ($G_{learned-y}$, $G_{learned-x}$), where the angle is expressed in degrees and is defined to be a positive number: $0°\leq\Theta<360°$, and the number of different bit intensity measures, i.e., the number of different possible bins into which $C_{learned}$ can be slotted, is $255=2^8-1$.

Alternatively, the step 225 of obtaining a learned circlet image corresponding to the learned gradient image may be carried out using a lookup table, for example, a 64 kilobyte (KB) lookup table that may pre-calculate approximate circlet values. A larger or smaller lookup table could be employed to provide more or less output circlet value resolution or to accommodate more or less input gradient component value resolution. The circlet for each learned pixel may be extracted from the lookup table given the pixel's gradient components Gx and Gy. For example, the lookup table (LUT) may pre-calculate the circlet value for each combination of the signed gradient components Gx and Gy: $C_{learned}$=LutCirclet $[G_{learned-x-lookup}+G_{learned-y-lookup}]$. Use of the lookup table may be represented as follows in pseudocode:

```
BYTE m_uLutCirclet[65536];
C = m_uLutCirclet[(((Gx >> 1) + 128) << 8) + (Gy >> 1) + 128]
```

Appendix F contains the C++ code for calculation of the lookup table. Accordingly, the circlet values each can range from 0 to 255 for an 8-bit lookup table. Lookup tables incorporating more or less bits could be employed to provide more or less circlet value resolution.

In this case, unlike the case above where the gradient magnitude is being computed and the sign of the gradient components is unimportant, here the signs of the gradient components $G_{learned-x}$ and $G_{learned-y}$ are important because the direction of the circlet angle C is important. Accordingly, the lookup table divides the gradient components, which each can range from −255 to 255, by two so that the value will range approximately from −127 to 127. Then the number 128 is added to map the values onto the desired numerical range from 1 to 255. For example, if $G_{learned-x}=-235$ and $G_{learned-y}=127$, calculation of the lookup table index proceeds as follows in pseudocode:

```
(((Gx >> 1) + 128) << 8) + (Gy >> 1) + 128
(((−235 >> 1) + 128) << 8) + (127 >> 1) + 128
((−117 + 128) << 8) + 63 + 128
(11 << 8) + 191
(11 * 256) + 191
2816 + 191
3007
```

The result is 3007. The definition of C maps a 360-degree circle onto the numbers 1 through 255, facilitating the expression of $C_{learned}$ in a single byte. The value 0 may be reserved for a learned circlet whose value is not determined, for example, where $G_{learned-y}$ and $G_{learned-x}$ are each either equal to zero or below a predetermined threshold. Accordingly, a value of $C_{learned}$ of approximately 1 or approximately 255 may be associated with a predominant positive learned gradient along the X axis, a value of $C_{learned}$ of approximately 65 may be associated with a predominant positive learned gradient along the Y axis, a value of $C_{learned}$ of approximately 128 may be associated with a predominant negative learned gradient along the X axis, and a value of $C_{learned}$ of approximately 191 may be associated with a predominant negative learned gradient along the Y axis. Each learned pixel of the learned image may then be represented by a learned pixel representing the corresponding value of $C_{learned}$ for that learned pixel, thereby generating a learned circlet image. A learned circlet image may be rendered for display by, for example, as shown in the below TABLE, aligning the visible spectrum with the whole numbers from 1 to 255.

| | |
|---|---|
| 0 Black | Undetermined circlet |
| 1 Red | 0 Degrees |
| 43 Yellow | 60 Degrees |
| 86 Green | 120 Degrees |
| 128 Cyan | 180 Degrees |
| 171 Blue | 240 Degrees |
| 213 Magenta | 300 Degrees |
| 255 Almost Red | 360 Degrees |

Step 230 of computing a learned non-maximum suppression image from the learned circlet image may be carried out using any standard non-maximum suppression image computation technique on the learned gradient image. A learned image comprising a set of learned edgels may thereby be generated. An "edgel", as used in this document, is an edge pixel.

Step 235 includes extracting edgels from the learned non-maximum suppression image to create edgel chains. An edgel chain is a list of one or more connected edgels. Two edgels are considered connected when they are directly adjacent or within a specified distance of one another allowing edgel chains to span gaps. This step may be carried out according to any technique known in the art, for example, by thresholding the non-maximum suppression image and subsequently extracting all edgels with a gradient magnitude above the threshold.

Step 240 includes determining a circlet consistency score for each learned edgel. The learned edgel consistency score is configured to reflect circlet consistency in close proximity along the edgel chain. The smaller the difference between learned circlets in close proximity to one another, the larger the learned edgel consistency score.

Each edgel includes of a position coordinate, a gradient magnitude (0-255), a circlet (0-255), and is a member of an edgel chain. The first step in determining a learned edgel consistency score might be to eliminate all edgels that are not a member of an edgel chain which is at least as long as a parameter $P_0$. If $P_0=11$, all edgels chains that contain less than 11 edgels would be eliminated.

Next, a learned edgel circlet consistency score may be calculated for the remaining edgels. For example, a circlet consistency score could be calculated as follows. For each edgel $E_1$, examine all edgels that are no farther away in either direction along the edgel chain than $P_1$ edgels, where $P_1$ is another parameter. If $E_1$ is closer to either end of the edgel chain than $P_1$ edgels, the consistency score is set equal to zero. If $E_1$ is at least $P_1$ edgels away from either end of the edgel chain, then find the edgel $E_2$ within $P_1$ edgels that has a circlet that is most different from that of $E_1$.

Next, the circlet difference between $E_1$ and $E_2$ is calculated, and the absolute value of that difference is subtracted from 256 to obtain the circlet consistency score. For example, if $E_1$ has a circlet of 235, and $P_1=5$, then examine all edgels within five edgels of $E_1$ in either direction along the same edgel chain and find the edgel $E_2$ whose circlet is the most different from 235. For example, an edgel $E_2$ with a circlet of 185 may have the biggest difference. Therefore the consistency score would be 256−ABS(235−185)=256−55=201.

Step 245 includes using the learned edgel consistency score and the learned edgel gradient magnitude to calculate the learned edgel combined score. The step preferably includes looping through all the edgels that have not been eliminated and finding the highest gradient magnitude and the highest circlet consistency score. The step then preferably includes looping through all the edgels and calculating their learned combined score using the following formula: CombinedScore=(EdgelGradient/MaxEdgelGradient)+(EdgelCircletConsistencyScore/MaxEdgelCircletConsistencyScore). Pseudocode for determining the scores of the edgels appears in Appendix B.

Step 250 includes using the learned edgel combined scores and the position of the edgel relative to the feature of interest to select one or more learned edgels to be employed as the primary probes suitable for correlation with the learned or target images.

A pattern comprises one or more probe sets. A probe set comprises one or more probes. A probe comprises a circlet and a positional offset from the pattern origin. Preferably, but not necessarily, a probe set comprises between 10 and 500 probes. A probe set can be divided into primary and secondary probes. Preferably, not necessarily, between about five and about twenty probes within a probe set are primary probes and the rest are secondary probes. Preferably, but not necessarily, selected probes within a probe set are widely and evenly dispersed across the feature of interest.

Step 255 includes using the learned edgel combined scores and the position of the edgel relative to the feature of interest to select one or more learned edgels from the set of edgels not already selected as primary probes to be employed as the secondary probes suitable for correlation with the learned or target images.

In step 260, alternative probe sets may be selected. Use of alternate probe sets may be advantageous in increasing tolerance to missing or corrupted regions of the feature of interest. Preferably, but not necessarily, a pattern comprises between five and ten probe sets. Normally all probe sets will be comprised of the same number of probes; if not, the circlet difference sums must be normalized by the number of probes in a given probe set.

Step 265 includes saving the selected probe sets as a learned pattern in a secure location. The learned pattern information may be saved in memory, on a hard drive, or on a flash drive, or in any location from which the information may subsequently be retrieved for future use.

In step 270, an image is acquired of a feature of interest. The image may be acquired from any source such as a camera, a network (e.g., the Internet), a storage device, a scanner, or any other suitable device. A target image may be comprised of an array of target pixels, each having a position that may be expressed by two coordinates along two non-parallel axes. The two axes are preferably though not necessarily orthogonal. For example, a target image may comprise a set of target pixels, each target pixel being characterized by a first coordinate along a first axis or other directional gradient, for example, a first coordinate x along the X axis, and a second coordinate along a second axis or other directional gradient, for example, a second coordinate y along the Y axis.

In step 275, filtering the target image reduces random noise. This step may, for example, be carried out using a three by three averaging filter or a similar filter or according to any technique known in the art. Preferably, but not necessarily, the same filter used in step 215 is employed.

In step 280, a target gradient image corresponding to the target image may be generated according to any computational or lookup technique known in the art such as, for example, the Sobel edge detection algorithm. For example, in analogy with step 220 of generating the learned gradient image, a target gradient image may comprise a set of target gradient pixels, each target pixel being characterized by a target gradient first component along a first axis or other directional gradient, for example, a target gradient component $G_{target-x}$ along the X axis, and a target gradient second component along a second axis or other directional gradient, for example, a target gradient component $G_{target-y}$ along the Y axis. Learned edge gradient Glearned may be computed according to the following equation: $G_{target}=\sqrt{(G^2_{target-x}+G^2_{target-y})}$. Alternatively, again in analogy with step 220 of generating the learned gradient image, step 280 of generating the target gradient image may be carried out using a lookup table, for example, a 64 kilobyte (KB) lookup table that may pre-calculate approximate values of target gradient components. For example, the lookup table may pre-calculate the target gradient value for each target pixel as the sum of the absolute values of the X and Y components of the target gradient in the lookup table: $G_{target}=|G_{target-x-lookup}|+|G_{target-y-lookup}|$.

Step 285 generates an array of target circlets comprising a target circlet image, which may be calculated using formulae analogous to those used in step 225. For example, $G_{target-x}=I_{target-(x,y)}-I_{target-(x-,y)}$ and similarly $G_{target-y}=I_{target-(x,y)}-I_{target-(x,y-1)}$, where $I_{target-(x,y)}$ is the intensity for the edgel at position (x,y). Alternatively: $G_{target-x}=(I_{target-(x+,y)}-I_{target-(x-1,y)})/2$ and $G_{target-y}=(I_{target-(x,y+1)}-I_{target-(x,y-1)})/2$. Regardless of the formula selected, target circlet $C_{target}$ may be computed for one or more target image pixels according to the following formula: $C_{target}=\{\Theta_{target}*255/360\}+1$, w where $C_{target}$ is the target circlet value, the target edge direction angle $\Theta_{target}=$a tan 2 $(G_{target-y}, G_{target-x})$, where the angle is expressed in degrees and is defined to be a positive number: $0°\leq\Theta<360°$.

Alternatively, as discussed above, instead of computation, a lookup table may be employed that may pre-calculate approximate values of C. This may be carried out by pre-calculating $C_{target}$ for each target pixel as the sum of the absolute values of the X and Y components of the gradient in the lookup table: $G=|G_{x-lookup}|+|G_{y-lookup}|$.

As above, this definition maps a 360-degree circle onto the numbers 1 through 255, facilitating the expression of $C_{target}$ in a single byte. The value 0 may be reserved for a target circlet whose value is not yet determined, for example, where $G_{target-y}$ and $G_{learned-x}$ are each either equal to zero or below a predetermined threshold. Accordingly, a value of $C_{target}$ of approximately 1 or approximately 255 may be associated with a predominant positive gradient along the X axis, and so on in analogy with the discussion above. Each target pixel of the target image may then be represented by a target pixel representing the corresponding value of $C_{target}$ for that target pixel, thereby generating a target circlet image. A target circlet image may be rendered for display by, for example, as shown in the above TABLE, aligning the visible spectrum with the whole numbers from 1 to 255. A positive gradient along the X axis ($C_{target}$ of approximately 1 or approximately 255) may be denoted by a red color, and so on as discussed above.

In step 290, using the array of target circlets, the target image is correlated or matched with the learned pattern. Location of the feature of interest can then be carried out.

Figure 4:
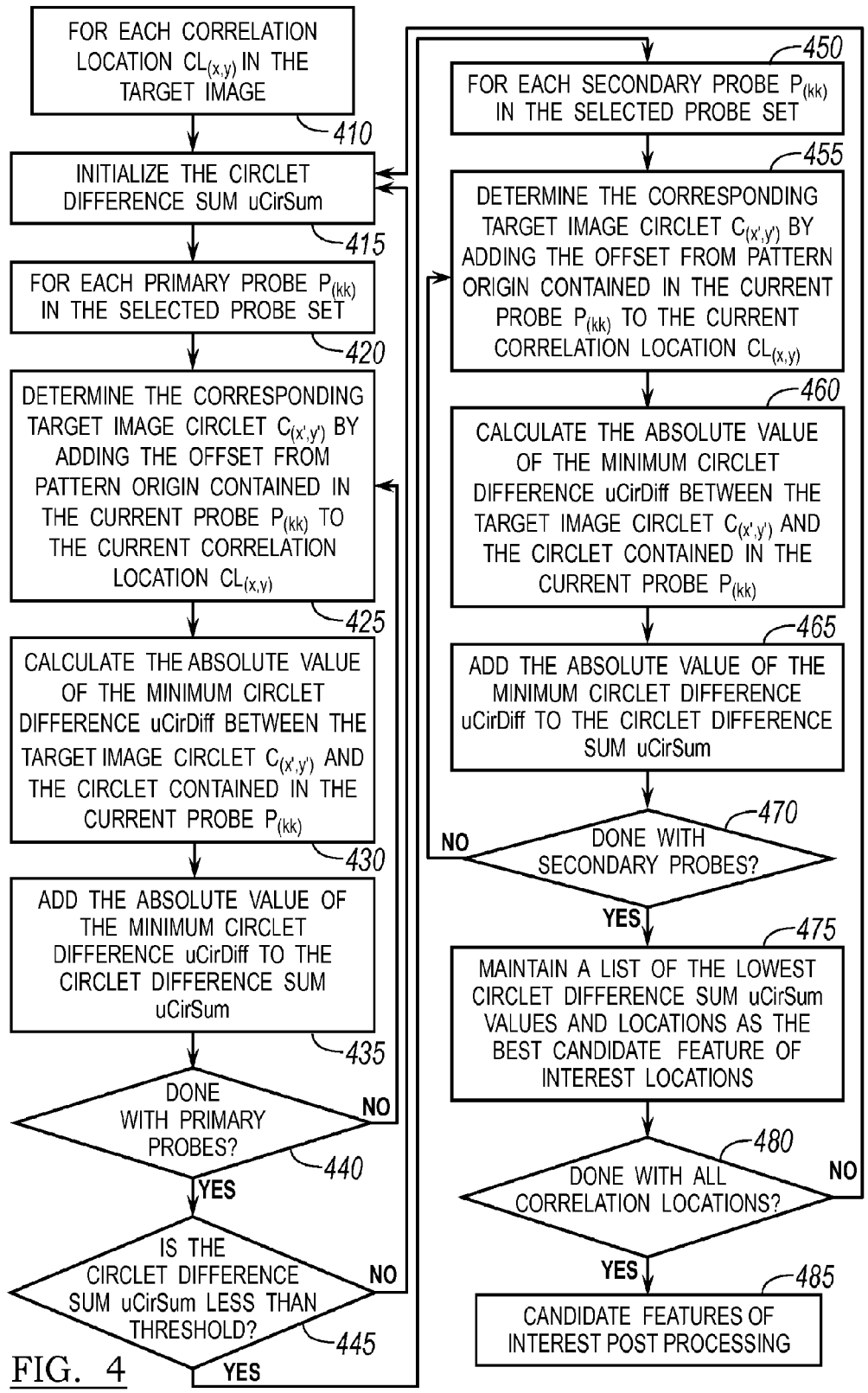
FIG. 4 is a flowchart illustrating sub-steps in a method of fixed-rotation location of a feature of interest according to a first set of embodiments of the invention.
Figure 5C:
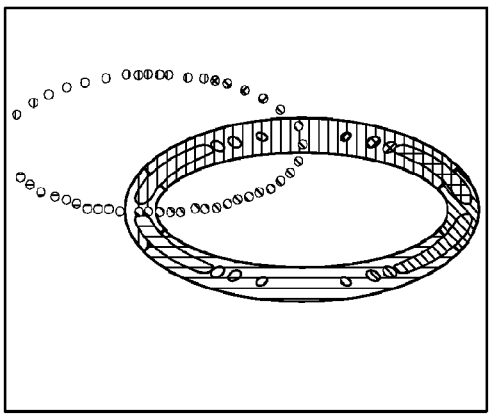
FIG. 5 is a set of nine illustrations showing an example of how the invention may be used to locate a feature of interest at the same orientation as the learned image according to the first set of embodiments of the invention.
Figure 5F:
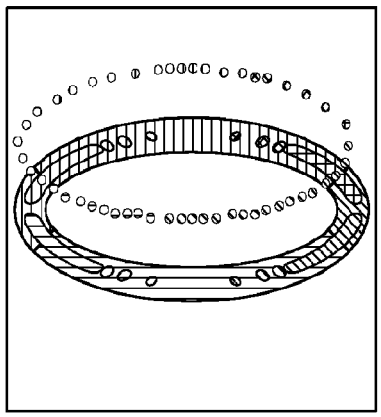
Figure 5B:
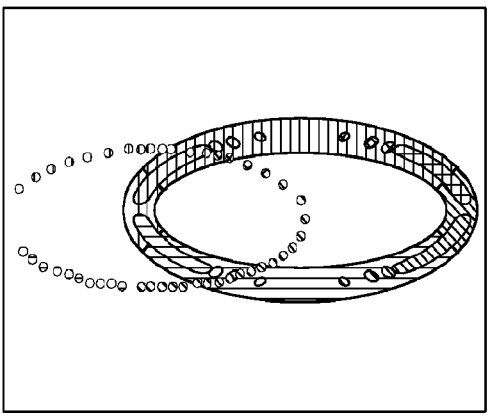
Figure 5E:
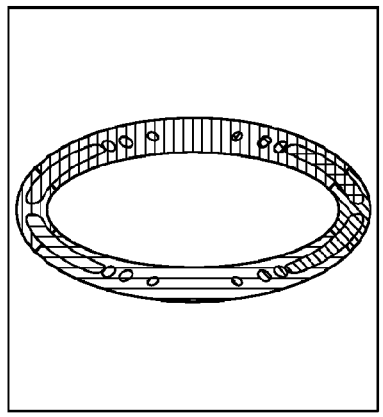
Figure 5A:
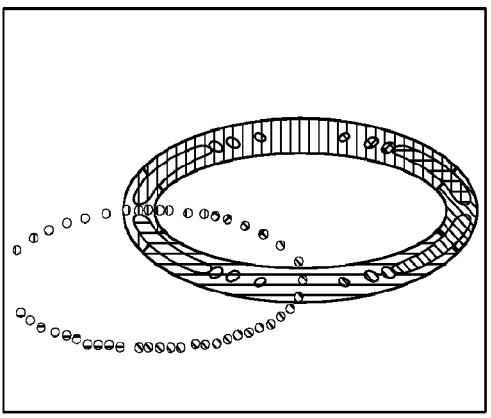
Figure 5D:
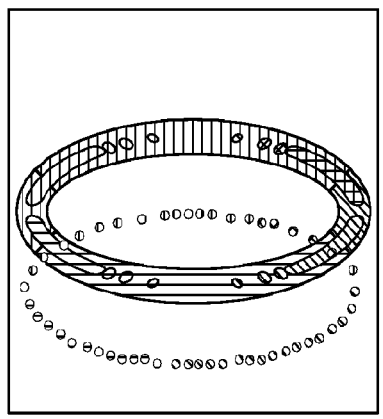
Figure 5G:
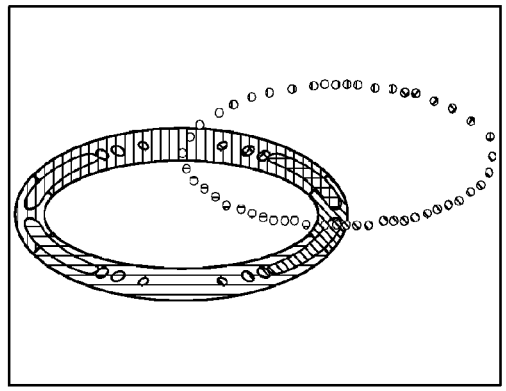
Figure 6A:
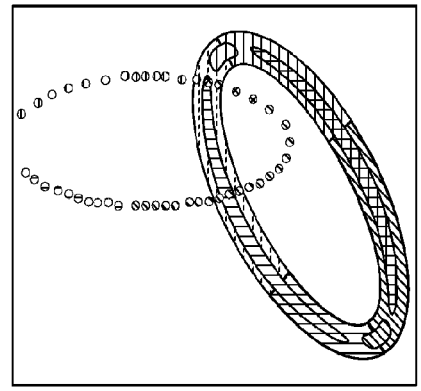
FIG. 6 is a set of nine illustrations showing an example of how the invention may be used to locate a feature of interest at a different orientation from the learned image according to the first set of embodiments of the invention.
Figure 5H:
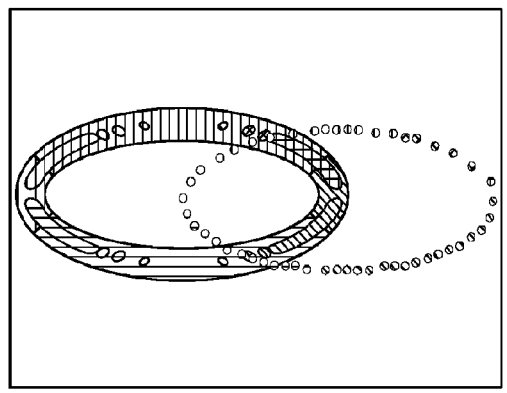
Figure 6B:
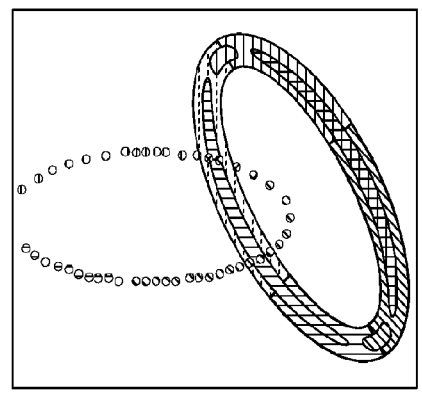
Figure 5I:
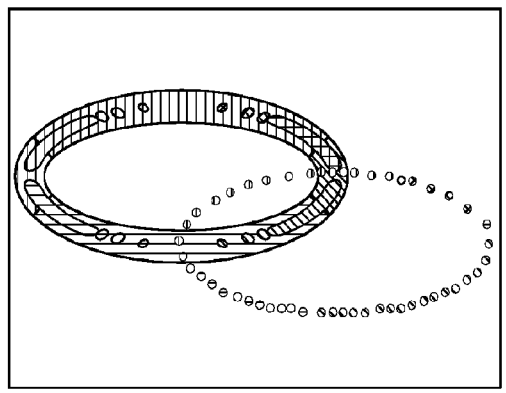
Figure 6C:
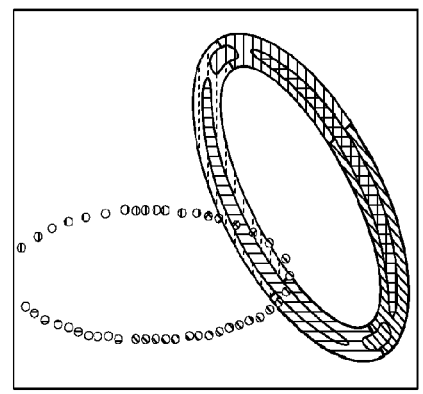
Figure 6F:
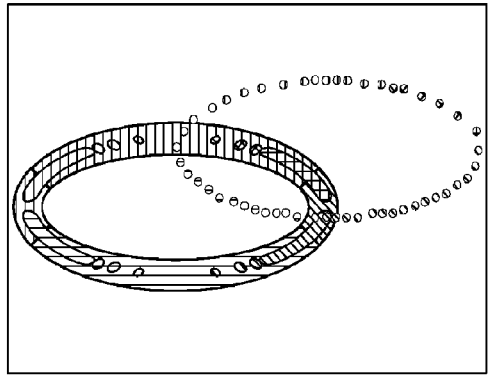
Figure 6I:
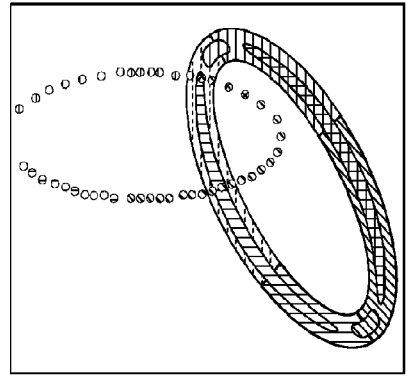
Figure 6E:
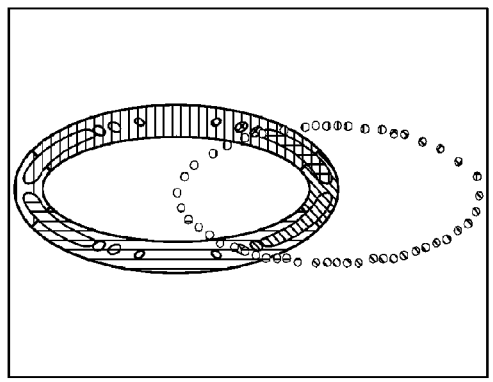
Figure 6H:
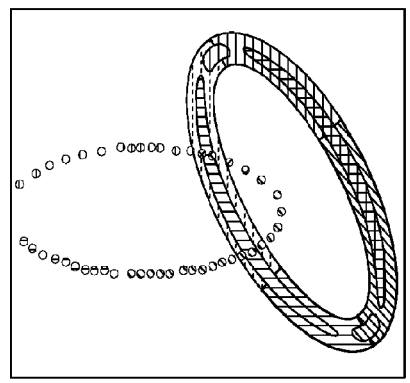
Figure 6D:
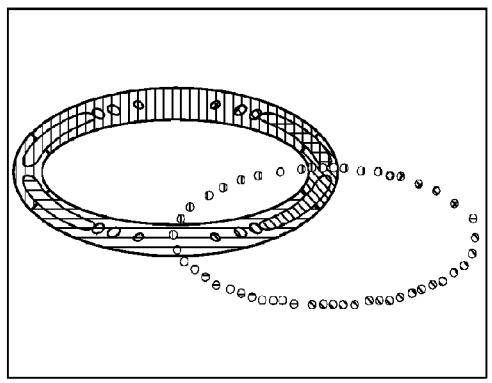
Figure 6G:
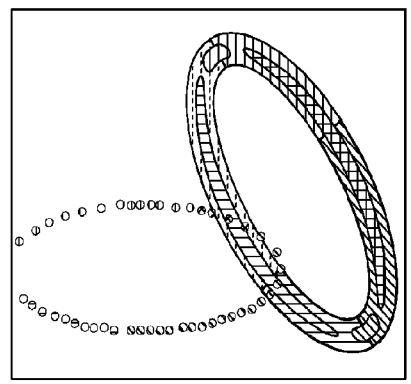

According to a first embodiment 400 as shown in FIG. 4, step 190 for fixed-rotation correlation or matching of the learned probes with the target circlet image preferably includes the sub-steps of: looping 410 through each correlation location $CL_{(x,y)}$ in the target image; for each correlation location $CL_{(x,y)}$, initialize 415 the circlet difference sum uCirSum; loop 420 through each primary probe $P_{(kk)}$ in the selected probe set; for each primary probe $P_{(kk)}$ in the selected probe set, determine 425 the corresponding target image circlet $C_{(x',y')}$ by adding the offset from pattern origin contained in the current probe $P_{(kk)}$ to the current correlation location $CL_{(x,y)}$; calculate 430 the absolute value of the minimum circlet difference uCirDiff between the target image circlet $C_{(x',y')}$ and the circlet contained in the current probe $P_{(kk)}$; add 435 the absolute value of the minimum circlet difference uCirDiff to the circlet difference sum uCirSum; if 440 all primary probes in the selected probe set have been processed then continue processing with step 445, otherwise advance to the next primary probe to be processed and continue processing at step 425; if 445 the circlet difference sum uCirSum is less than a threshold indicating a potential match with the feature of interest at the current correlation location $CL_{(x,y)}$ then continue processing the probe set's secondary probes at step 450, otherwise advance to the next correlation location $CL_{(x,y)}$ and continue processing with step 415; loop 450 through each secondary probe $P_{(kk)}$ in the selected probe set; for each secondary probe $P_{(kk)}$ in the selected probe set, determine 455 the corresponding target image circlet $C_{(x',y')}$ by adding the offset from pattern origin contained in the current probe $P_{(kk)}$ to the current correlation location $CL_{(x,y)}$; calculate 460 the absolute value of the minimum circlet difference uCirDiff between the target image circlet $C_{(x',y')}$ and the circlet contained in the current probe $P_{(kk)}$; add 465 the absolute value of the minimum circlet difference uCirDiff to the circlet difference sum uCirSum; if 470 all secondary probes in the selected probe set have been processed then continue processing with step 475, otherwise advance to the next secondary probe to be processed and continue processing at step 455; maintain 475 a list of the lowest circlet difference sum uCirSum values and there locations as the best candidate feature of interest locations for post processing later in step 485; if 480 all correlation locations $CL_{(x,y)}$ have been processed then continue processing with step 485, otherwise advance to the next correlation location $CL_{(x,y)}$ to be processed and continue processing at step 415; post process 485 the list of candidate feature of interest locations from step 475 in order to select one best location when searching for a single occurrence of the feature of interest or the best list of locations when searching for multiple occurrences of the feature of interest.

Step 410 includes looping through the correlation locations $CL_{(x,y)}$ in the target image. Preferably, but not necessarily, the step includes looping through all target circlet image rows (y) and then for each row, loop through all target circlet image columns (x). Optionally, the step includes processing alternate rows and/or columns, every third row and/or column, every fourth row/and or column, and so on. Any exhaustive or sub-sampled search strategy known in the art could be utilized including region of interest processing where only selected regions within the target circlet image are processed.

In step 415, the circlet difference sum uCirSum is initialized. Preferably, but not necessarily, the value is initialized to zero.

Step 420 includes looping through the primary probes $P_{(kk)}$ in the selected probe set. Preferably, but not necessarily, the step includes looping through all primary probes sequentially. Optionally, the step may include looping through the primary probes in any order or skip one or more primary probes.

Step 425 includes determining the location of the circlet $C_{(x',y')}$ in the target circlet image corresponding to the current probe $P_{(kk)}$ by adding the offset from pattern origin contained in the current probe $P_{(kk)}$ to the current correlation location $CL_{(x,y)}$.

In step 430, the minimum circlet difference uCirDiff between the circlet contained in the current probe $P_{(kk)}$ and the value of the corresponding circlet $C_{(x',y')}$ in the target circlet image is calculated. This calculation can be performed directly or by using a pre-calculated lookup table.

Circlet values wrap around in the same way that angle values wrap around. For 8 bit circlets with values ranging from 0 to 255, a circlet value of 250 has approximately the same difference magnitude with both a circlet value of 240 and a circlet value of 5.

Preferably, but not necessarily, a circlet value of zero is reserved for undefined although any other circlet value could be so designated. The minimum difference between any two circlets, when either or both circlets are undefined, is commonly set equal to the value of a user adjustable parameter. Preferably, but not necessarily, this parameter will default to a value 64 which is, at least for 8 bit circlets, half of the largest possible difference magnitude between any two defined circlets. For example, if the value of this parameter were zero, then patterns could have a perfect match at any location in the target image where all of the circlets were undefined which could lead to a large number of false positives. If the value of this parameter is too large, for example set to the maximum difference magnitude of 127 or even larger, then it might prevent finding matches even when only small portions of the target feature of interest are missing or otherwise different from the learned feature of interest leading to false negatives. Preferably, but not necessarily, this parameter is fixed during active correlation but can be adjusted by the user to optimize performance for particular situations.

Appendix C contains pseudocode for calculating signed and unsigned minimum circlet differences.

In step 435, the absolute value of the minimum circlet difference uCirDiff is added to the circlet difference sum uCirSum.

In step 440, if not all of the primary probes in the selected probe set have been processed, then advance to the next probe to be processed and continue processing at step 425, otherwise continue processing at step 445.

Step 445 includes comparing the circlet difference sum uCirSum to a threshold to determine if there is a potential feature of interest match at the current correlation location $CL_{(x,y)}$. If the circlet difference sum is less than the threshold, then continue processing the secondary probes at step 450. If the circlet difference sum is not less than the threshold, then advance to the next correlation location $CL_{(x,y)}$ and continue processing at step 415. Although a less than threshold is described above, any threshold definition know in the art could be employed. The purpose of the two level probe designation, primary and secondary, is to reduce processing time by not processing all probes when the primary probes do not indicate a potential match with the feature of interest at the current correlation location $CL_{(x,y)}$. Although a two level probe designation is described, more or less levels could be employed. Preferably, but not necessarily, the threshold value is controlled by a user adjustable parameter multiplied by the number of primary probes being correlated.

Step 450 includes looping through the secondary probes $P_{(kk)}$ in the selected probe set. Preferably, but not necessarily, the step includes looping through all secondary probes sequentially. Optionally, the step may includes looping through the secondary probes in any order or skip one or more secondary probes.

Step 455 includes determining the location of the circlet $C_{(x',y')}$ in the target circlet image corresponding to the current probe $P_{(kk)}$ by adding the offset from pattern origin contained in the current probe $P_{(kk)}$ to the current correlation location $CL_{(x,y)}$ in an analogous manner to step 425.

In step 460, the minimum circlet difference uCirDiff between the circlet contained in the current probe $P_{(kk)}$ and the value of the corresponding circlet $C_{(x',y')}$ in the target circlet image is calculated. This calculation can be performed directly or by using a pre-calculated lookup table in an analogous manner to step 430.

In step 465, the absolute value of the minimum circlet difference uCirDiff is added to the circlet difference sum uCirSum in an analogous manner to step 435.

In step 470, if not all of the secondary probes in the selected probe set have been processed, then advance to the next probe to be processed and continue processing at step 455, otherwise continue processing at step 475.

Step 475 includes tracking of the best match locations, generally indicated by the lowest circlet difference sums, using any algorithm known in the art. Preferably, but not necessarily, a list of locations where the circlet difference sum was the lowest is generated for post processing after all correlation locations $CL_{(x,y)}$ have been processed.

In step 480, if not all of the correlation locations $CL_{(x,y)}$ have been processed, then advance to the next correlation location CL(x,y) to be processed and continue processing at step 415, otherwise continue processing at step 485.

Step 485 including posting process the feature of interest candidate locations from step 475 in order to select one best location when searching for a single occurrence of the feature of interest or the best list of locations when searching for multiple occurrences of the feature of interest. Preferably, but not necessarily, post processing includes, but is not limited to, additional correlation in the vicinity of the found location when a sub-sampled search strategy is employed, additional processing to eliminate false positive and negatives, position calculation to sub-pixel resolution. Post processing steps can be accomplished by any algorithms known to the art.

Appendix D contains pseudocode for the first embodiment.

For example, as shown in FIG. 5 (FIGS. 5A-5I), a nine-view sequence shows an example of how the invention can be used, with pattern probes being positioned in the circlet image using a 3×3 search algorithm to find a target feature of interest at the same orientation as the learned pattern. Only in FIG. 5E is there high correlation between the pattern probes and the target circlet image indicating a target feature of interest match.

As a second example, as shown in FIG. 6 (FIGS. 6A-6I), a nine-view sequence shows an example of how the invention can be used to find a target feature of interest at a different orientation from the learned image according to the first set of embodiments of the invention. As in FIG. 5, a 3×3 search algorithm is used, in this case to find a target feature of interest rotated at an angle of 60 degrees from the learned pattern. None of the nine search positions results in a high correlation between the pattern probes and the circlet image indicating a feature of interest location. FIG. 6 thus demonstrates limitations of standard correlation techniques when used to find a feature of interest rotated from the learned orientation.

Figure 7:
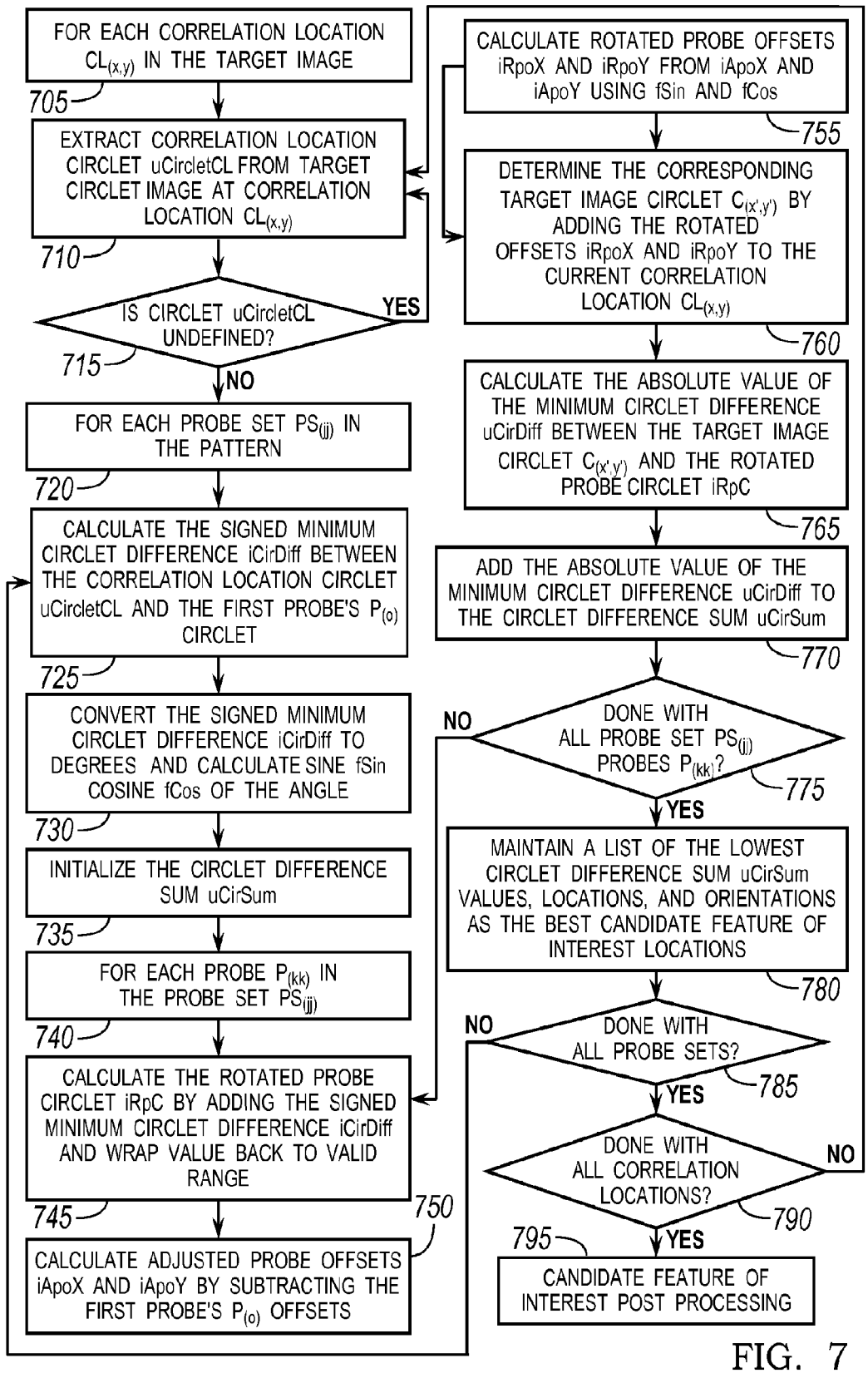
FIG. 7 is a is a flowchart illustrating sub-steps in a method of rotation-independent location of a feature of interest according to a second set of embodiments of the invention.
Figure 8A:
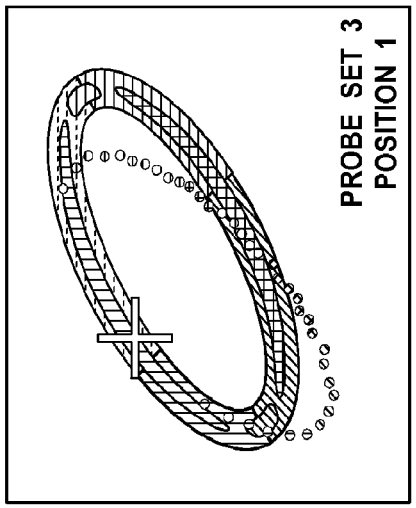
FIG. 8 is a set of illustrations showing five examples of possible circlet image correlation positions and the calculated probes for three different probe sets to locate a feature of interest at a different orientation from the learned image according to the second set of embodiments of the invention.
Figure 8D:
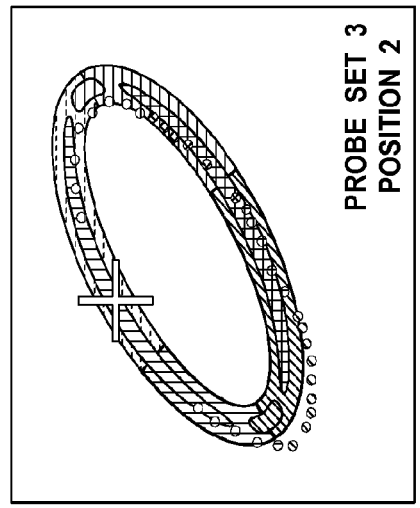
Figure 8B:
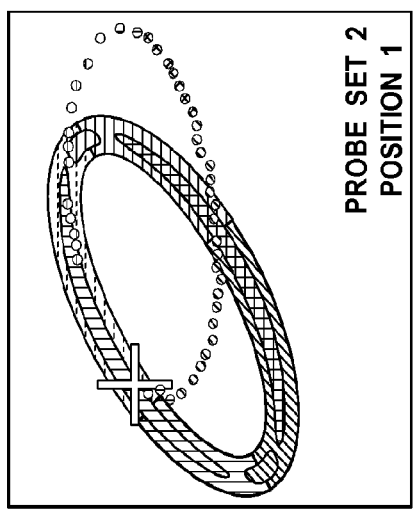
Figure 8E:
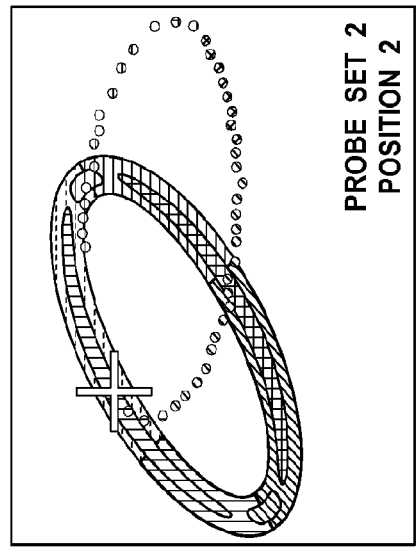
Figure 8C:
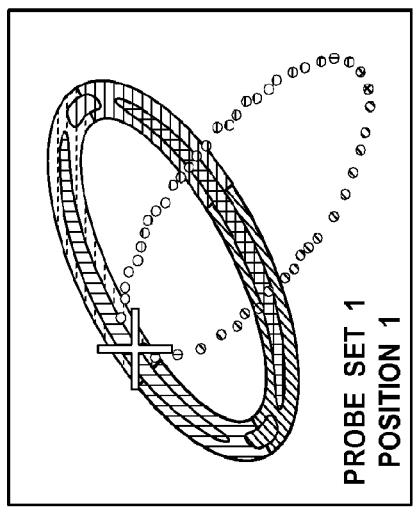
Figure 8F:
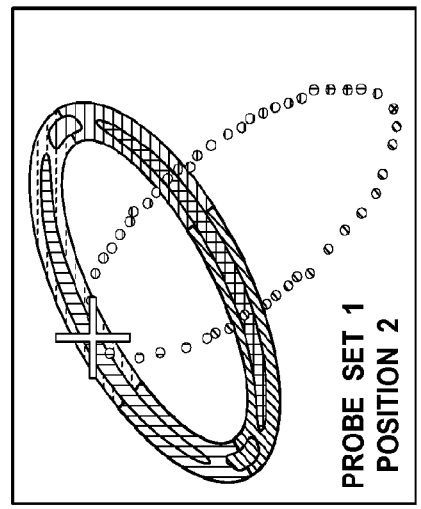
Figure 8G:
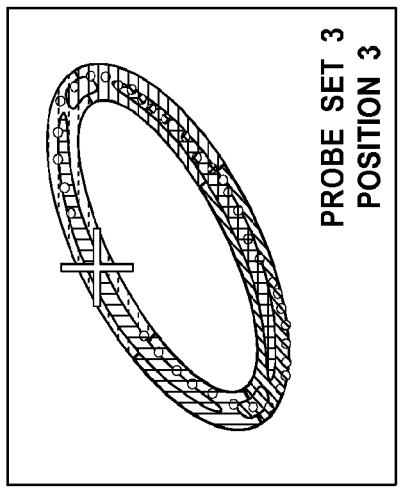
Figure 8J:
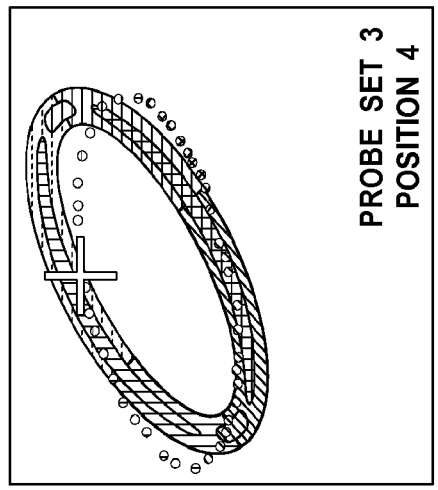
Figure 8H:
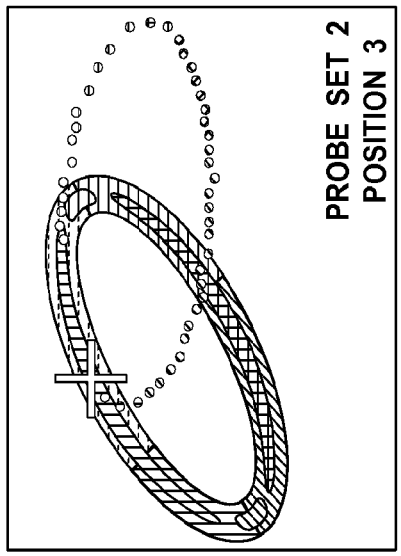
Figure 8K:
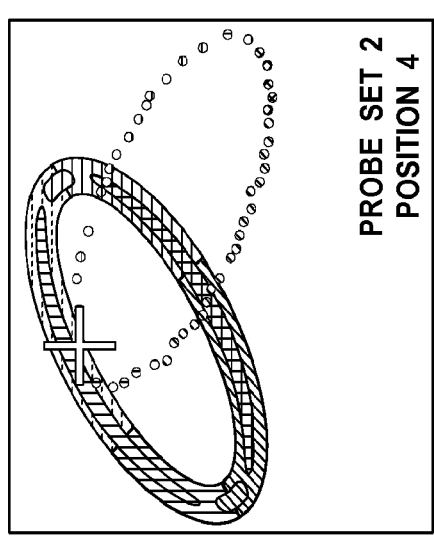
Figure 8I:
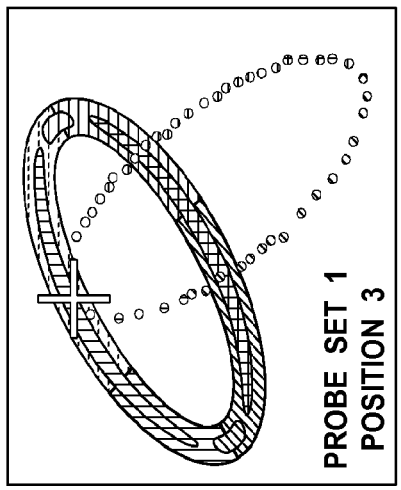
Figure 8L:
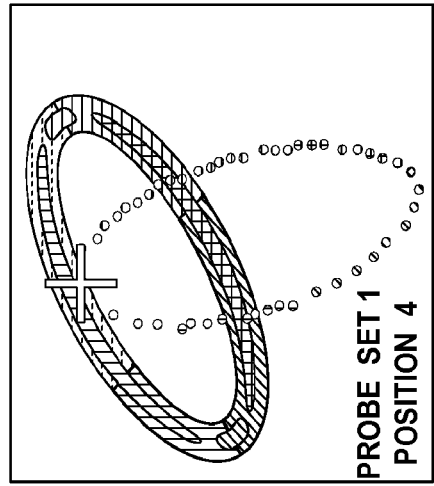
Figure 8M:
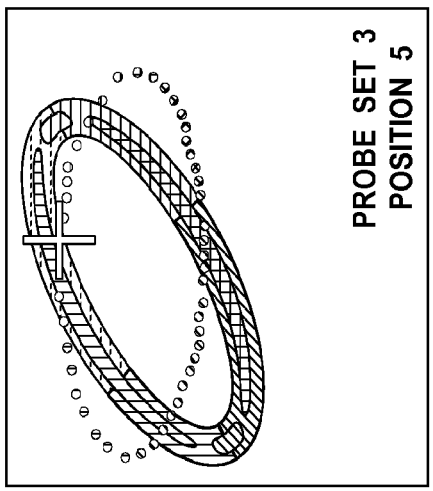
Figure 8N:
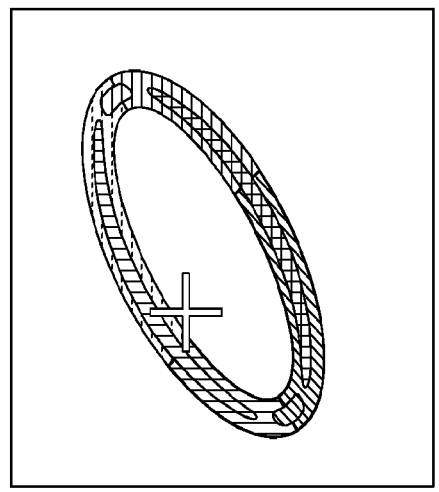
Figure 8O:
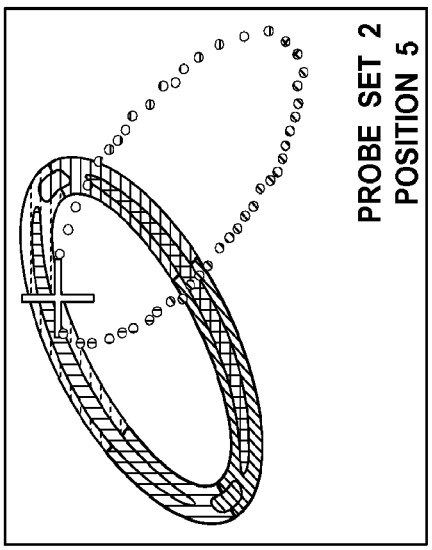

According to a second embodiment 700 as shown in FIG. 7, step 190 for rotation-independent correlation or matching of the learned probes with the target circlet image preferably includes the sub-steps of: looping 705 through each correlation location $CL_{(x,y)}$ in the target image; for each correlation location $CL_{(x,y)}$ in the target image, extract 710 the correlation location circlet uCircletCL from the target circlet image at correlation location $CL_{(x,y)}$; if 715 the circlet uCircletCL is undefined, advance to the next correlation location $CL_{(x,y)}$ and continue processing at step 710, otherwise continue processing at step 720; looping 720 through each probe set $PS_{(jj)}$ in the pattern; for each probe set $PS_{(jj)}$ in the pattern, calculate 725 the signed minimum circlet difference iCirDiff between the correlation location circlet uCircletCL and the circlet contained in the first probe $P_{(0)}$; convert 730 the signed minimum circlet difference iCirDiff to degrees and calculate sine f Sin and cosine f Cos of the angle; initialize 735 the circlet difference sum uCirSum; looping 740 through each probe $P_{(kk)}$ in the probe set $PS_{(jj)}$; for each probe $P_{(kk)}$ in the probe set $PS_{(jj)}$, calculate 745 the rotated probe circlet iRpC by adding the signed minimum circlet difference iCirDiff and wrapping the value back to the valid range as necessary; calculate 750 adjusted probe offsets iApoX and iApoY by subtracting the first probe's $P_{(0)}$ offsets; calculate 755 rotated probe offsets iRpoX and iRpoY from iApoX and iApoY using f Sin and f Cos; determine 760 the corresponding target image circlet $C_{(x',y')}$ by adding the rotated offsets iRpoX and iRpoY to the current correlation location $CL_{(x,y)}$; calculate 765 the absolute value of the minimum circlet difference uCirDiff between the target image circlet $C_{(x',y')}$ and the rotated probe circlet iRpC; add 770 the absolute value of the minimum circlet difference uCirDiff to the circlet difference sum uCirSum; if 775 there are no further probes $P_{(kk)}$ contained in probe set $PS_{(jj)}$ to be processed continue processing at step 780, otherwise advance to the next probe $P_{(kk)}$ to be processed in probe set $PS_{(jj)}$ and continue processing at step 745; maintain 780 a list of the lowest circlet difference sum uCirSum values, locations, and orientations as the best candidate feature of interest locations for post processing later in step 795; if 785 there are no further probe sets $PS_{(jj)}$ contained in the pattern to be processed continue processing at step 790, otherwise advance to the next probe set $PS_{(jj)}$ in the pattern and continue processing at step 725; if 780 all correlation locations $CL_{(x,y)}$ have been processed then continue processing with step 795, otherwise advance to the next correlation location $CL_{(x,y)}$ to be processed and continue processing at step 710; post process 795 the list of candidate feature of interest locations from step 780 in order to select one best location when searching for a single occurrence of the feature of interest or the best list of locations when searching for multiple occurrences of the feature of interest.

Step 705 includes looping through the correlation locations $CL_{(x,y)}$ in the target image. Preferably, but not necessarily, the step includes looping through all target circlet image rows (y) and then for each row, looping through all target circlet image columns (x). Optionally, the step may include processing alternate rows and/or columns, every third row and/or column, every fourth row/and or column, and so on. Any exhaustive or sub-sampled search strategy known in the art could be utilized including region of interest processing where only selected regions within the target circlet image are processed.

Step 710 includes extracting the correlation location circlet uCircletCL from target circlet image at correlation location $CL_{(x,y)}$.

Only locations in the target circlet image with a defined circlet can be processed for rotation-independent correlation. In step 715, if the correlation location circlet uCircletCL is undefined, then advanced to the next correlation location $CL_{(x,y)}$ and continue processing at step 705. If the correlation location circlet uCircletCL is defined, then processing at step 720.

Step 720 includes looping through the probe sets $PS_{(jj)}$ in the pattern. Preferably, but not necessarily, the step includes looping through all probe sets sequentially. Optionally, the step may include looping through the probe sets in any order or skip one or more probe sets.

Step 725 includes calculating the signed minimum circlet difference iCirDiff between the correlation location circlet uCircletCL and the circlet contained in the first probe $P_{(0)}$ in the current probe set $PS_{(jj)}$. This calculation can be performed directly or by using a pre-calculated lookup table.

Appendix C contains pseudocode for calculating signed and unsigned minimum circlet differences.

Step 730 includes converting the signed minimum circlet difference iCirDiff to degrees using the following formulae: fAngleDifference=iCirDiff*360.0/255.0. The sine f Sin of the angle can be calculated using a trigonometry function generally as follows converting degrees to radians as necessary using a constant: f Sin=sin (fAngleDifference*DEGSTORADS). The cosine f Sin of the angle can be calculated using the a trigonometry functions generally as follows converting degrees to radians as necessary using a constant: f Cos=cos (fAngleDifference*DEGSTORADS);

In step 735, the circlet difference sum uCirSum is initialized. Preferably, but not necessarily, the value is initialized to zero.

Step 740 includes looping through the all probes $P_{(kk)}$ in the current probe set $PS_{(jj)}$. Preferably, but not necessarily, the step includes looping through all probes sequentially. Optionally, the step may include looping through the probes in any order or skip one or more probes. Although a single level probe designation is described here, more or less levels could be employed. Preferably, but not necessarily, a two level designation, primary and secondary, is employed as previously described in embodiment 400. In this example, a single level probe designation has been chosen for clarity.

Step 745 includes calculating the rotated probe circlet iRpC by adding the signed minimum circlet difference iCirDiff to the circlet contained in the current probe $P_{(kk)}$ as illustrated in the following pseudocode: iRpC=sProbes[kk].uCirclet+iCirDiff. The value of iRpC must be wrapped to the valid range which, at least for 8 bit circlets, is 1 to 255. This can be performed as illustrated in the following pseudocode for 8 bit circlets: if (iRpC<1) iRpC+=255; if (iRpC>255) iRpC-=255.

Step 750 includes calculating the adjusted probe offsets iApoX and iApoY by subtracting the offsets contained in the first probe's $P_{(0)}$ of the current probe set $PS_{(jj)}$ as illustrated in the following pseudocode: iApoX=sProbes[kk].iOffsetX−sProbes[0].iOffsetX; iApoY=sProbes[kk].iOffsetY−sProbes[0].iOffsetY;

Step 755 includes rotating the adjusted probe offsets iApoX and iApoY using the sine f Sin and cosine f Cos values calculated in step 730 as illustrated in the following pseudocode: fRpoX=f Cos*iApoX−f Sin*iApoY; fRpoY=f Sin*iApoX+f Cos*iApoY. The resulting floating point values are generally converted to integers be use by truncation, rounding, or any other algorithm known in the art as illustrated in the following pseudocode: iRpoX=ROUNDOFF (fRpoX); iRpoY=ROUNDOFF(fRpoY).

Step 760 includes determining the corresponding target image circlet $C_{(x',y')}$ by adding the rotated offsets iRpoX and iRpoY to the current correlation location $CL_{(x,y)}$.

In step 765, the minimum circlet difference uCirDiff between the rotated probe circlet iRpC and the value of the corresponding circlet $C_{(x',y')}$ in the target circlet image is calculated. This calculation can be performed directly or by using a pre-calculated lookup table.

Circlet values wrap around in the same way that angle values wrap around. For 8 bit circlets with values ranging from 0 to 255, a circlet value of 250 has approximately the same difference magnitude with both a circlet value of 240 and a circlet value of 5.

Preferably, but not necessarily, a circlet value of zero is reserved for undefined although any other circlet value could be so designated. The minimum difference between any two circlets, when either or both circlets are undefined, is commonly set equal to the value of a user adjustable parameter. Preferably, but not necessarily, this parameter will default to a value 64 which is, at least for 8 bit circlets, half of the largest possible difference magnitude between any two defined circlets. For example, if the value of this parameter were zero, then patterns could have a perfect match at any location in the target image where all of the circlets were undefined which could lead to a large number of false positives. If the value of this parameter is too large, for example set to the maximum difference magnitude of 127 or even larger, then it might prevent finding matches even when only small portions of the target feature of interest are missing or otherwise different from the learned feature of interest leading to false negatives. Preferably, but not necessarily, this parameter is fixed during active correlation but can be adjusted by the user to optimize performance for particular situations.

Appendix C contains pseudocode for calculating signed and unsigned minimum circlet differences.

In step 770, the absolute value of the minimum circlet difference uCirDiff is added to the circlet difference sum uCirSum.

In step 775, if not all of the probes $P_{(kk)}$ in the current probe set $PS_{(jj)}$ have been processed, then advance to the next probe to be processed in the current probe set $PS_{(jj)}$ and continue processing at step 745, otherwise continue processing at step 780.

Step 480 includes tracking of the best match locations, generally indicated by the lowest circlet difference sums, using any algorithm known in the art. Preferably, but not necessarily, a list of locations where the circlet difference sum was the lowest is generated for post processing after all correlation locations $CL_{(x,y)}$ have been processed.

In step 785, if not all of the probe sets $PS_{(jj)}$ have been processed, then advance to the next probe set to be processed in the current pattern and continue processing at step 725, otherwise continue processing at step 790.

In step 790, if not all of the correlation locations $CL_{(x,y)}$ have been processed, then advance to the next correlation location CL(x,y) to be processed and continue processing at step 710, otherwise continue processing at step 795.

Step 795 includes posting process the feature of interest candidate locations from step 485 in order to select one best location when searching for a single occurrence of the feature of interest or the best list of locations when searching for multiple occurrences of the feature of interest. Preferably, but not necessarily, post processing includes, but is not limited to, additional correlation in the vicinity of the found location when a sub-sampled search strategy is employed, additional processing to eliminate false positive and negatives, position calculation to sub-pixel resolution. Post processing steps can be accomplished by any algorithms known to the art.

Appendix E contains pseudocode for the second embodiment.

Although the description and pseudocode for the second embodiment perform all calculations to adjust and rotate the probes based on the circlet at the current correlation location for clarity, most of these calculations can, and typically are, pre-calculated. Preferably, but not necessarily, each probe set is adjusted and rotated for each possible value of the signed minimum circlet difference so that the appropriate pre-calculated probe set can simply be accessed, instead of calculated, when the signed minimum circlet difference is determined. This function is generally performed when the selected probes are saved as a pattern, namely pattern generation.

Appendix B contains C++ code illustrating pattern generation.

FIG. 8 (FIG. 8A-8O) is a set of illustrations showing five examples (FIGS. 8A-8C, FIGS. 8D-8F, FIGS. 8G-8I, FIGS. 8J-8L, and FIGS. 8M-8O) of possible circlet image correlation positions, as indicated by the crosses. For each position, the calculated probes are shown for three different probe sets. Only in FIG. 7I (position 3; probe set 3) is a very high correlation shown between the pattern and the circlet image, indicating a pattern location. It is expected that probe sets 1 and 2 will correlate highly for circlet image positions other than positions 1-5.

FIG. 9 is a set of illustrations showing eighteen examples (FIGS. 9A-9R) of how the probes may be positioned in the target circlet image to find a target pattern at a different orientation from the learned image using a search step of two pixels for a single probe set according to the second set of embodiments of the invention. As shown in FIGS. 9A-9D, the circlets at the circlet image positions are undetermined (i.e., the gradients zero or below a predetermined threshold); therefore, the pattern probe orientations cannot be calculated and no correlation is performed.

As shown in FIGS. 9E-9I, the probe set orientation can change based on the value of the circlet at the circlet image position. The primary probes are shown in green and the secondary probes are shown in red.

Figure 9A:
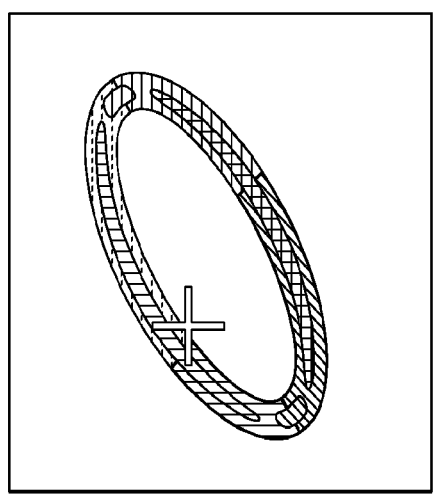
FIG. 9 is a set of illustrations showing eighteen examples of how the probes may be positioned in the target circlet image to locate a feature of interest at a different orientation from the learned image using a single probe set according to the second set of embodiments of the invention.
Figure 9B:
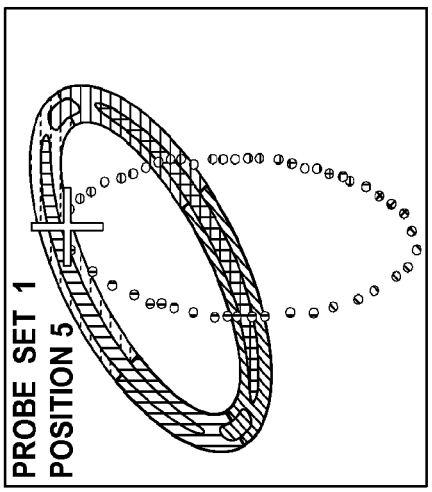
Figure 9C:
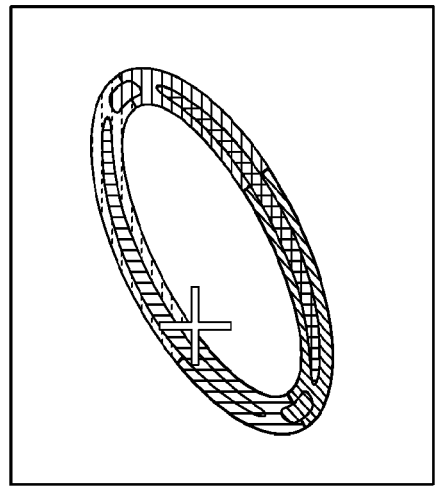
Figure 9F:
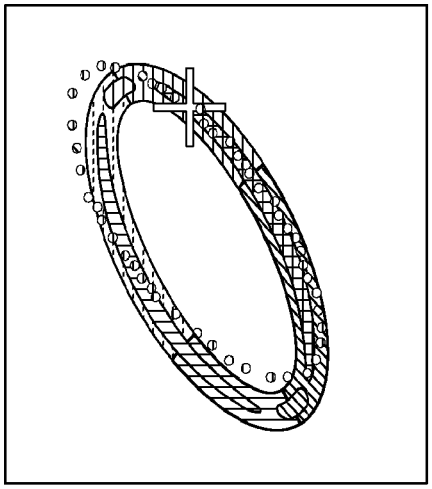
Figure 9I:
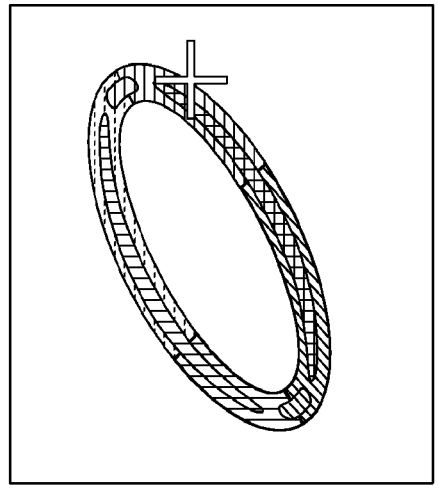
Figure 9E:
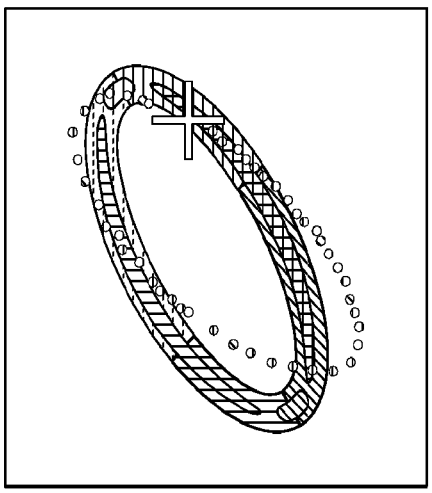
Figure 9H:
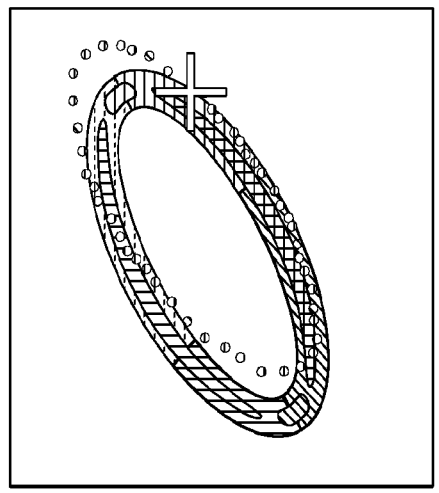
Figure 9D:
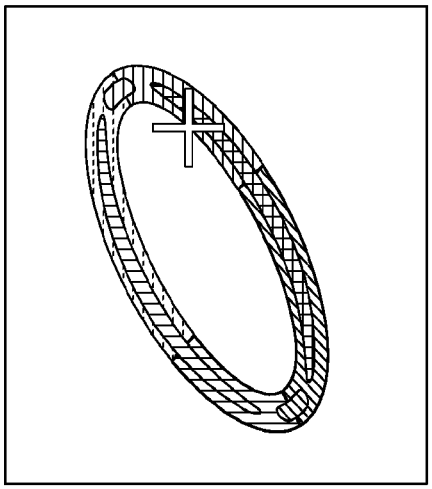
Figure 9G:
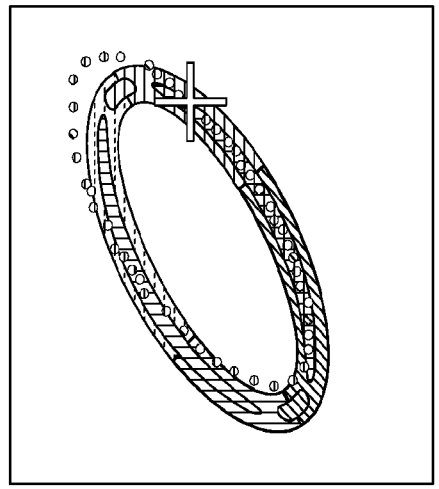
Figure 9J:
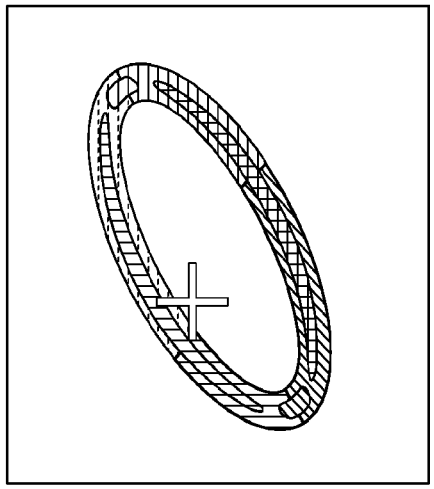
Figure 9M:
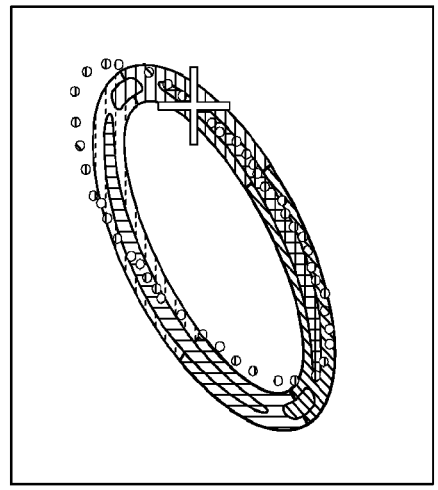
Figure 9K:
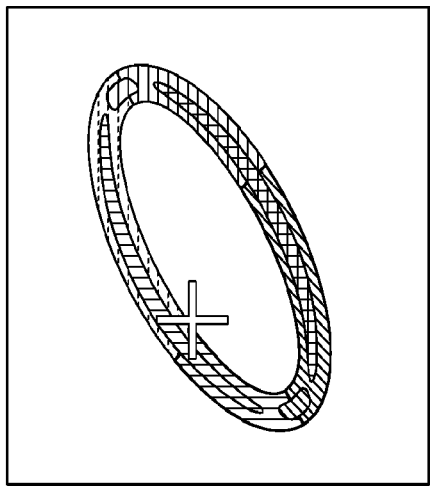
Figure 9N:
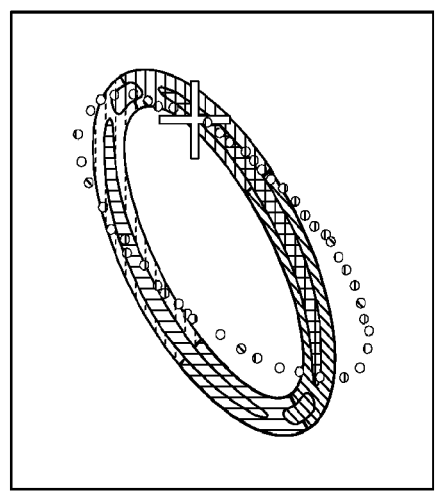
Figure 9L:
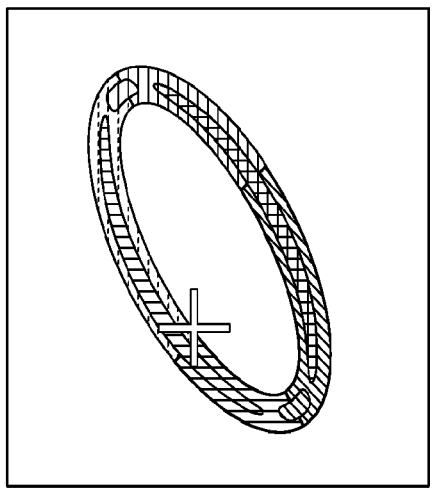
Figure 9O:
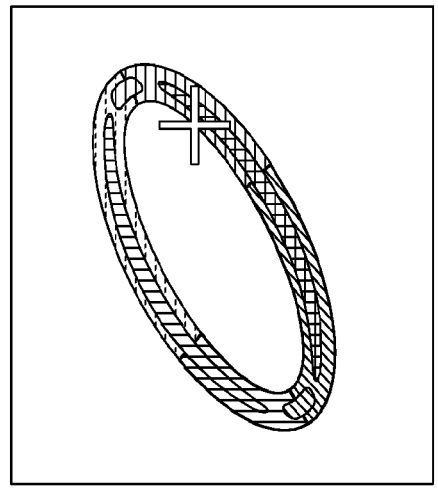
Figure 9P:
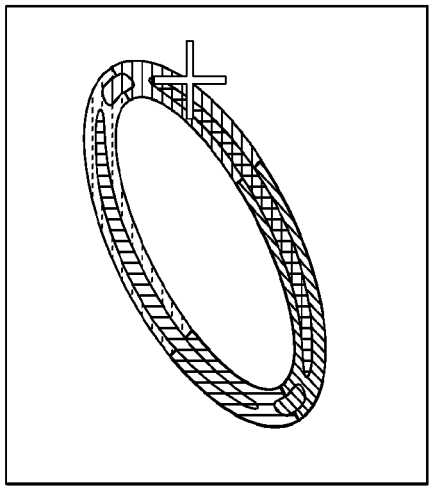
Figure 10A:
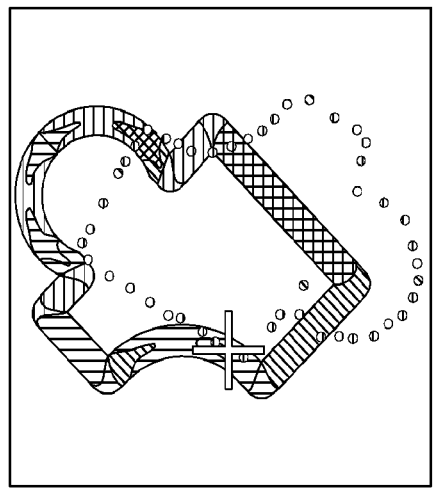
FIG. 10 is a set of illustrations showing nine examples of how the probes may be positioned in the target circlet image to locate a non-symmetrical feature of interest at a different orientation from the learned image using a single probe set according to the second set of embodiments of the invention.
Figure 9Q:
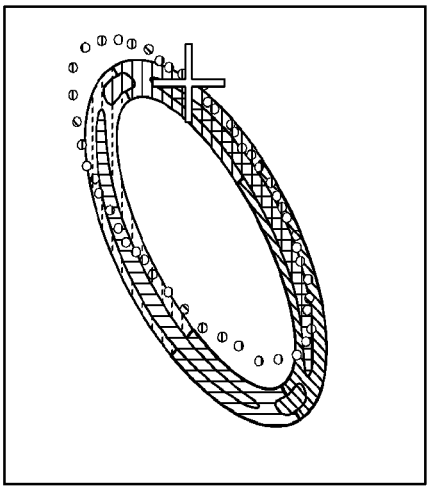
Figure 10B:
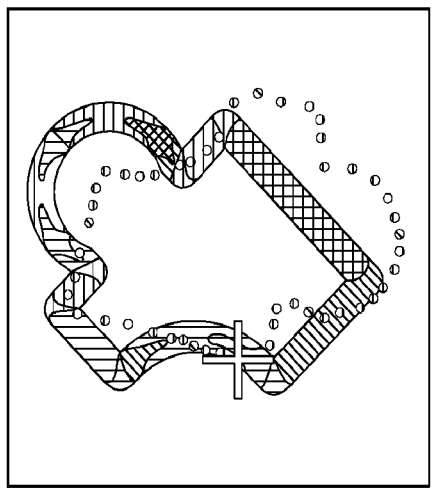
Figure 9R:
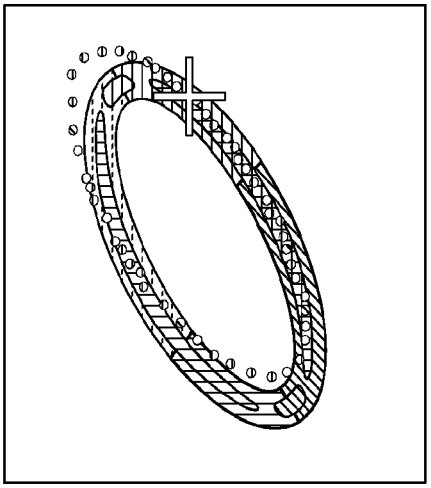
Figure 10C:
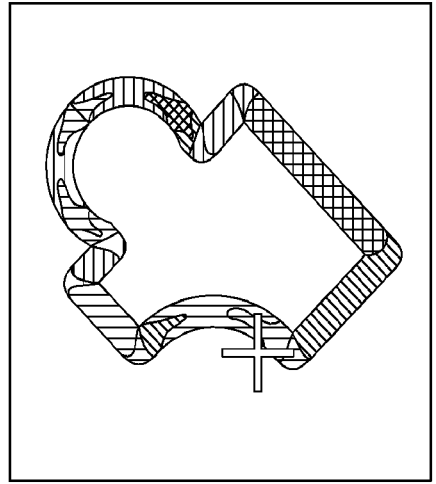
Figure 10D:
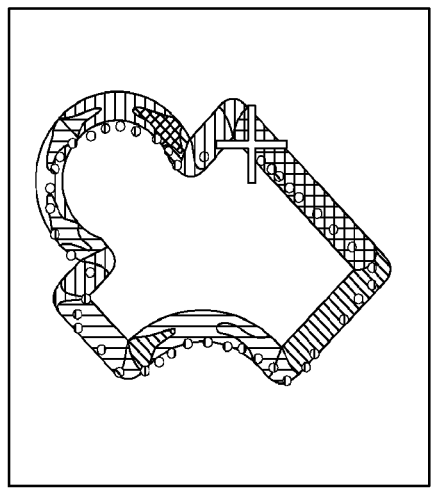
Figure 10E:
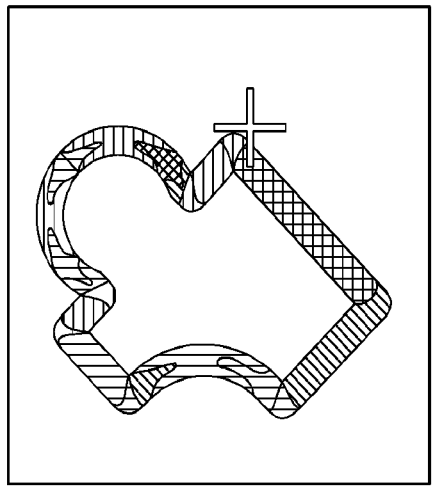
Figure 10F:
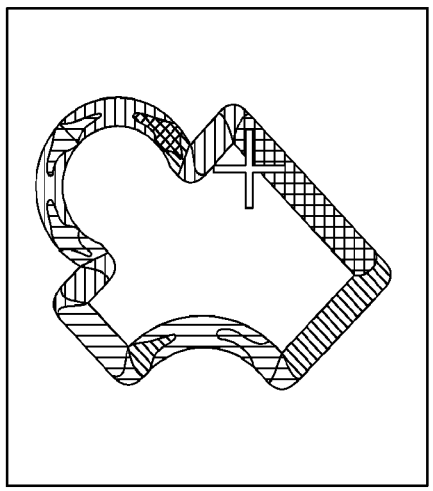
Figure 10G:
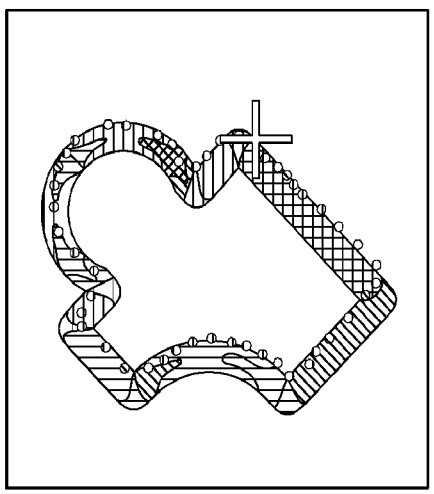
Figure 10H:
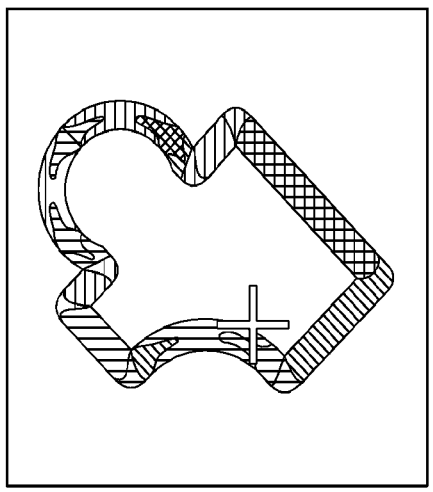
Figure 10I:
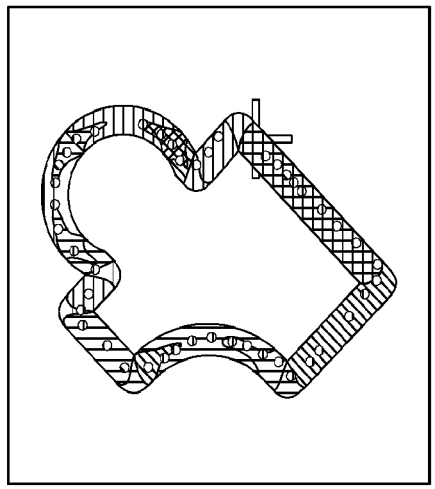

As shown in FIGS. 9J-9L, the circlet is undetermined as the search position moves off of the pattern, so that no correlation is performed.

As shown in FIGS. 9M-9R, example probe set orientations are shown as the correlation position moves to the other side of the pattern.

FIG. 10 is a set of illustrations (FIGS. 10A-10I) showing nine examples of how the probes may be positioned in the target circlet image to find a non-symmetrical target pattern at a different orientation from the learned image using a search step of four pixels for a single probe set along a single circlet image row according to the second set of embodiments of the invention. For clarity, this figure only shows search positions in which the circled is determined or that are adjacent to a determined circlet.

As a person skilled in the art will recognize from the previous detailed description and from the figures and claims, modifications and changes can be made to the preferred embodiments of the invention without departing from the scope of this invention defined in the following claims.

Appendices: Code

APPENDIX A

C++ CODE FOR CREATING LOOKUP TABLE FOR GRADIENT CALCULATION

```
BOOL     CProcess::m_bLutGradient    = FALSE;
BYTE     CProcess::m_uLutGradient[65536];
void     CProcess::CalcLutGradient( )
{
long     we, ns;
long     uG;
double   fG;
/*
**  Check for Gradient LUT Already Calculated
*/
if (m_bLutGradient)
   return;
/*
**  Calculate the Gradient LUT
**
**      G = sqrt(Gx^2 + Gy^2)
**
**  Loop Through the West/East Gradient Values
*/
for (we = 0 ; we < 256 ; we++)
   {
   /*
   ** Loop Through the North/South Gradient Values
   */
   for (ns = 0 ; ns < 256 ; ns++)
      {
      /*
      ** Calculate the Combined Gradient
      */
      fG = sqrt((double)((we * we) + (ns * ns)));
      /*
      ** Convert to Integer
      */
      uG = ROUNDOFF(fG);
      /*
      ** Clamp
      */
      if (uG > 255)
```

APPENDIX A-continued

C++ CODE FOR CREATING LOOKUP TABLE FOR GRADIENT CALCULATION

```
         uG = 255;
      /*
      ** Store
      */
      m_uLutGradient[(we << 8) + ns] = (BYTE)uG;
      }
   }
/*
** Set to Calculated
*/
m_bLutGradient = TRUE;
}
```

APPENDIX B

PSEUDOCODE FOR CALCULATING CONSISTENCY SCORES FOR EDGELS AND PATTERN GENERATION

```
long     CPinPoint::GeneratePattern(CPinPoint::defPATTERN *sPattern)
{
long     ii, jj, kk;
long     iProbeGroups;
long     iRoughProbes;
long     iPatternProbes;
long     iOffsetX, iOffsetY;
long     iOffsetRX, iOffsetRY;
long     iCirclet;
long     iCircletDiff;
long     iOrientation;
long     iProbeCirclet;
long     *iEdgelPool;
double   fMaxGradient;
double   fMaxCirclet;
double   fAngleDiff;
double   fSin, fCos;
double   fRX, fRY;
BYTE     uCirclet;
RECT     rExtents;
defPROBE      *sProbes;
defPROBESET   *sProbeSet;
/*
** Extract and Clamp
*/
iProbeGroups   = CLAMP(m_iProbeGroups,
CPINPOINT_LL_ProbeGroups, CPINPOINT_HL_ProbeGroups);
iRoughProbes   = CLAMP(m_iRoughProbes,
CPINPOINT_LL_RoughProbes, CPINPOINT_HL_RoughProbes);
iPatternProbes = CLAMP(m_iPatternProbes,
CPINPOINT_LL_PatternProbes, CPINPOINT_HL_PatternProbes);
/*
** Free Pattern Probes
*/
FreePatternProbes(sPattern);
/*
** Calculate the Orientation Parameters
*/
GenerateOrientation(sPattern);
/*
** Allocate the Edgel Pool Array
*/
if ((iEdgelPool = (long*)SysMalloc(sizeof(long) * iPatternProbes)) ==
NULL)
   {
   /*
   ** Out of Memory
   */
   StatusWarn(DLL_SL(CLS_CPINPOINT), FSTR("GeneratePattern"),
STATUS_ERROR, DLL_SL(WRN_GENERAL_OUTOFMEM));
   return(FAILURE);
   }
/*
** Edgel Pool Allocated
** Initialize to Calculate Edgel Maximum Averages
*/
```

APPENDIX B-continued

PSEUDOCODE FOR CALCULATING CONSISTENCY SCORES FOR EDGELS AND PATTERN GENERATION

```
fMaxGradient  = 0.0;
fMaxCirclet   = 0.0;
/*
** Loop Through the Edgels
*/
for (ii = 0 ; ii < sPattern->iEdgels ; ii++)
    {
    /*
    ** Reset Edgel Usage Flags
    */
    sPattern->sEdgels[ii].uFlags &= ~CPINPOINT_EdgelFlag_Usage;
    /*
    ** Check for Edgel Enabled
    */
    if (sPattern->sEdgels[ii].uFlags & CPINPOINT_EdgelFlag_Enabled)
        {
        /*
        ** Edgel Enabled
        ** Set Edgel Available Flag
        */
        sPattern->sEdgels[ii].uFlags |= CPINPOINT_EdgelFlag_Available;
        /*
        ** Update Maximums
        */
        if (sPattern->sEdgels[ii].fAvgGradient > fMaxGradient)
            fMaxGradient = sPattern->sEdgels[ii].fAvgGradient;
        if (sPattern->sEdgels[ii].fAvgCirclet > fMaxCirclet)
            fMaxCirclet = sPattern->sEdgels[ii].fAvgCirclet;
        }
    }
/*
** Never Divide By Zero
*/
if (fMaxGradient < 1.0)
    fMaxGradient = 1.0;
if (fMaxCirclet < 1.0)
    fMaxCirclet = 1.0;
/*
** Calculate the Normalized Edgel Scores
** Loop Through the Edgels
*/
for (ii = 0 ; ii < sPattern->iEdgels ; ii++)
    {
    /*
    ** Check for Edgel Enabled
    */
    if (sPattern->sEdgels[ii].uFlags & CPINPOINT_EdgelFlag_Enabled)
        {
        /*
        ** Edgel Enabled
        ** Calculate the Normalized Edgel Score
        */
        sPattern->sEdgels[ii].fScore =
        (float)(sPattern->sEdgels[ii].fAvgGradient /
        fMaxGradient + sPattern->sEdgels[ii].fAvgCirclet / fMaxCirclet);
        }
    }
/*
** Generate the Edgel Pool
*/
if ((iPatternProbes = GenerateEdgelPool(sPattern, iPatternProbes,
iEdgelPool)) < CPINPOINT_LL_PatternProbes)
    {
    /*
    ** Too Few Edgels Available
    */
    SysFree(iEdgelPool);
    StatusWarn(DLL_SL(CLS_CPINPOINT), FSTR("GeneratePattern"),
STATUS_SERIOUS, "Too few edgels available!");
    return(FAILURE);
    }
/*
** Valid Edgel Pool
** Allocate Pattern Probes
*/
if (AllocPatternProbes(sPattern, iProbeGroups, iPatternProbes) !=
SUCCESS)
    {
    /*
    ** Allocate Pattern Probes Failed
    */
    SysFree(iEdgelPool);
    return(FAILURE);
    }
/*
** Clamp Number of Rough Probes
*/
if (iRoughProbes > iPatternProbes − 1)
    iRoughProbes = iPatternProbes − 1;
///////////////////////////////////////////////////////////////
//
//   Generate Prime Probe Group
//
///////////////////////////////////////////////////////////////
/*
** Extract Pointer to the Prime Probe Set Probes
*/
sProbes = sPattern->sProbeGrps[0].sProbeSets[0].sProbes;
/*
** Initialize Probe Extents Rectangle
*/
rExtents.left   = MAXLONG;
rExtents.top    = MAXLONG;
rExtents.right  = MINLONG;
rExtents.bottom = MINLONG;
/*
** Copy Probes from Edgel Pool
*/
for (ii = 0 ; ii < iPatternProbes ; ii++)
    {
    /*
    ** Initialize Probe
    */
    sProbes[ii].uCirclet = sPattern->sEdgels[iEdgelPool[ii]].uCirclet;
    sProbes[ii].iX       = sPattern->sEdgels[iEdgelPool[ii]].iX −
(short)sPattern->sCorrCenter.x;
    sProbes[ii].iY       = sPattern->sEdgels[iEdgelPool[ii]].iY −
(short)sPattern->sCorrCenter.y;
    /*
    ** Update Probe Extents
    */
    rExtents.left   = MIN(rExtents.left, sProbes[ii].iX);
    rExtents.top    = MIN(rExtents.top, sProbes[ii].iY);
    rExtents.right  = MAX(rExtents.right, sProbes[ii].iX);
    rExtents.bottom = MAX(rExtents.bottom, sProbes[ii].iY);
    /*
    ** Update Edgel Flags
    */
    if (ii < iRoughProbes)
        {
        /*
        ** Prime Rough Probe
        */
        sPattern->sEdgels[iEdgelPool[ii]].uFlags |=
        CPINPOINT_EdgelFlag_PrimeRough;
        }
    else
        {
        /*
        ** Prime Normal Probe
        */
        sPattern->sEdgels[iEdgelPool[ii]].uFlags |=
        CPINPOINT_EdgelFlag_PrimeNormal;
        }
    }
/*
** Save Probe Extents
*/
```

APPENDIX B-continued

PSEUDOCODE FOR CALCULATING CONSISTENCY SCORES FOR EDGELS AND PATTERN GENERATION

```
sPattern->sProbeGrps[0].sProbeSets[0].rExtents = rExtents;
//////////////////////////////////////////////////////////
//
//    Generate Group Probe Sets
//
//////////////////////////////////////////////////////////
/*
**   Check for Compact Pattern Generation
*/
if ((m_bCompactGeneration) || (iPatternProbes < iRoughProbes *
(iProbeGroups + 1)))
    {
    /*
    **   Compact Pattern Generation
    **   Loop Through the Probe Groups
    */
    for (ii = 1 ; ii <= iProbeGroups ; ii++)
        {
        /*
        **   Extract Pointer to the Probe Set Probes
        */
        sProbes = sPattern->sProbeGrps[ii].sProbeSets[0].sProbes;
        /*
        **   Loop Through the Rough Probes
        */
        for (jj = 0, kk = 0 ; jj < iRoughProbes ; jj++)
            {
            /*
            **   Skip Prime
            */
            if (ii - 1 != jj)
                {
                /*
                **   Not Prime
                **   Copy Probe
                */
                sProbes[kk].uCirclet =
                sPattern->sEdgels[iEdgelPool[jj]].uCirclet;
                sProbes[kk].iX    = sPattern->sEdgels[iEdgelPool[jj]].iX;
                sProbes[kk].iY    = sPattern->sEdgels[iEdgelPool[jj]].iY;
                /*
                **   Increment Probe Set Probe Index
                */
                kk++;
                }
            }
        /*
        **   Add Last Rough Probe
        */
        sProbes[kk].uCirclet = sPattern->sEdgels[iEdgelPool[jj]].uCirclet;
        sProbes[kk].iX    = sPattern->sEdgels[iEdgelPool[jj]].iX;
        sProbes[kk].iY    = sPattern->sEdgels[iEdgelPool[jj]].iY;
        /*
        **   Increment Probe Set Probe index
        */
        kk++;
        /*
        **   Add Prime Probe As First Non-Rough Probe
        */
        sProbes[kk].uCirclet = sPattern->sEdgels[iEdgelPool[ii -
        1]].uCirclet;
        sProbes[kk].iX    = sPattern->sEdgels[iEdgelPool[ii - 1]].iX;
        sProbes[kk].iY    = sPattern->sEdgels[iEdgelPool[ii - 1]].iY;
        /*
        **   Add Remaining Probes
        */
        for (jj = iRoughProbes + 1 ; jj < iPatternProbes ; jj++)
            {
            /*
            **   Copy Probe
            */
            sProbes[jj].uCirclet = sPattern->sEdgels[iEdgelPool[jj]].uCirclet;
            sProbes[jj].iX    = sPattern->sEdgels[iEdgelPool[jj]].iX;
            sProbes[jj].iY    = sPattern->sEdgels[iEdgelPool[jj]].iY;
            }
        }
    }
else
    {
    /*
    **   Not Compact Pattern Generation
    **   Loop Through the Edgel Pool to Set/Reset Edgel Flags
    */
    for (jj = 0 ; jj < iPatternProbes ; jj++)
        {
        /*
        **   Set Available Flag When Not Prime Rough Probe Edgel
        */
        if (!(sPattern->sEdgels[iEdgelPool[jj]].uFlags &
        CPINPOINT_EdgelFlag_PrimeRough))
            {
            /*
            **   Not Prime Rough Probe Edgel
            **   Set Available Flag
            */
            sPattern->sEdgels[iEdgelPool[jj]].uFlags |=
            CPINPOINT_EdgelFlag_Available;
            }
        else
            {
            /*
            **   Prime Rough Probe Edgel
            **   Reset Available Flag
            */
            sPattern->sEdgels[iEdgelPool[jj]].uFlags &=
            ~CPINPOINT_EdgelFlag_Available;
            }
        /*
        **   Reset Used Flag
        */
        sPattern->sEdgels[iEdgelPool[jj]].uFlags &=
        ~CPINPOINT_EdgelFlag_GroupUsed;
        }
    /*
    **   Calculate the Probes For Each Probe Group
    **   Loop Through the Probe Groups
    */
    for (ii = 1 ; ii <= iProbeGroups ; ii++)
        {
        /*
        **   Extract Pointer to the Probe Set Probes
        */
        sProbes = sPattern->sProbeGrps[ii].sProbeSets[0].sProbes;
        /*
        **   Generate Group Rough Probes
        */
        if (GenerateRoughProbes(sPattern, iRoughProbes * (iProbeGroups +
        1), iEdgelPool, sProbes, iRoughProbes) != iRoughProbes)
            {
            /*
            **   Generate Group Rough Probes Failed
            */
            SysFree(iEdgelPool);
            StatusWarn(DLL_SL(CLS_CPINPOINT),
            FSTR("GeneratePattern"), STATUS_SERIOUS, "Generate group
            %ld rough probes failed!", ii);
            return(FAILURE);
            }
        /*
        **   Add Remaining Unused Edgels
        **   Loop Through the Edgel Pool
        */
        for (jj = 0, kk = iRoughProbes ; jj < iPatternProbes ; jj++)
            {
            /*
            **   Check for Edgel Already Used
            */
            if (sPattern->sEdgels[iEdgelPool[jj]].uFlags &
            CPINPOINT_EdgelFlag_GroupUsed)
                {
                /*
                **   Edgel Already Used
                **   Reset Used Flag
                */
```

APPENDIX B-continued

PSEUDOCODE FOR CALCULATING CONSISTENCY SCORES FOR EDGELS AND PATTERN GENERATION

```
            sPattern->sEdgels[iEdgelPool[jj]].uFlags &=
~CPINPOINT_EdgelFlag_GroupUsed;
          }
          else
          {
            /*
            **    Edgel Not Already Used
            **    Add Probe
            */
            sProbes[kk].uCirclet =
sPattern->sEdgels[iEdgelPool[jj]].uCirclet;
            sProbes[kk].iX    = sPattern->sEdgels[iEdgelPool[jj]].iX;
            sProbes[kk].iY    = sPattern->sEdgels[iEdgelPool[jj]].iY;
            /*
            **    Increment Probe Index
            */
            kk++;
          }
        }
        /*
        **    Verify
        */
        ASSERT(kk == iPatternProbes);
      }
    }
    /*
    **    Loop Through the Group Probe Sets
    */
    for (ii = 1 ; ii <= iProbeGroups ; ii++)
    {
      /*
      **    Extract Pointer to the Probe Set Probes
      */
      sProbes = sPattern->sProbeGrps[ii].sProbeSets[0].sProbes;
      /*
      **    Initialize Probe Extents Rectangle
      */
      rExtents.left   = MAXLONG;
      rExtents.top    = MAXLONG;
      rExtents.right  = MINLONG;
      rExtents.bottom = MINLONG;
      /*
      **    Offset Probes From Correlation Center
      **    Loop Through the Pattern Probes
      */
      for (jj = 0 ; jj < iPatternProbes ; jj++)
      {
        /*
        **    Offset Probe From Correlation Center
        */
        sProbes[jj].iX -= (short)sPattern->sCorrCenter.x;
        sProbes[jj].iY -= (short)sPattern->sCorrCenter.y;
        /*
        **    Update Probe Extents
        */
        rExtents.left   = MIN(rExtents.left,   sProbes[ii].iX);
        rExtents.top    = MIN(rExtents.top,    sProbes[ii].iY);
        rExtents.right  = MAX(rExtents.right,  sProbes[ii].iX);
        rExtents.bottom = MAX(rExtents.bottom, sProbes[ii].iY);
      }
      /*
      **    Save Extents Rectangle
      */
      sPattern->sProbeGrps[ii].sProbeSets[0].rExtents = rExtents;
    }
////////////////////////////////////////////////////////////
//
//    Process Probe Groups
//
////////////////////////////////////////////////////////////
    /*
    **    Loop Through the Probe Groups
    */
    for (ii = 0 ; ii <= iProbeGroups ; ii++)
    {
      /*
      **    Extract Local Pointer to Probe Group Base Probes
```

APPENDIX B-continued

PSEUDOCODE FOR CALCULATING CONSISTENCY SCORES FOR EDGELS AND PATTERN GENERATION

```
      */
      sProbes = sPattern->sProbeGrps[ii].sProbeSets[0].sProbes;
      /*
      **    Check for First Probe Group
      */
      if (ii == 0)
      {
        /*
        **    First Probe Group
        **    Reset Orientation Probe Circlet and Offset to Pattern Center
        */
        uCirclet = 1;
        iOffsetX = 0;
        iOffsetY = 0;
      }
      else
      {
        /*
        **    Not First Probe Group
        **    Extract Orientation Probe Circlet and Offset to Pattern Center
        */
        uCirclet =
sPattern->sProbeGrps[0].sProbeSets[0].sProbes[ii].uCirclet;
        iOffsetX = -sPattern->sProbeGrps[0].sProbeSets[0].sProbes[ii].iX;
        iOffsetY = -sPattern->sProbeGrps[0].sProbeSets[0].sProbes[ii].iY;
      }
      /*
      **    Loop Through the Circlet Orientations
      */
      for (iCirclet = 1 ; iCirclet < 256 ; iCirclet++)
      {
        /*
        **    Extract Local Pointer to the Orientation Probe Set
        */
        sProbeSet = &sPattern->sProbeGrps[ii].sProbeSets[iCirclet];
        /*
        **    Check for First Probe Group
        */
        if (ii == 0)
        {
          /*
          **    First Probe Group
          **    Calculate the Orientation Angle Directly
          */
          iCircletDiff = iCirclet;
          fAngleDiff   = CProcess::CircletToAngle((BYTE)iCircletDiff);
        }
        else
        {
          /*
          **    Not First Probe Group
          **    Calculate the Offset From the Orientation Probe Circlet
          */
          iCircletDiff = CProcess::m_iLutCircletDiff[(iCirclet << 8) +
uCirclet];
          /*
          **    Calculate the Angle Difference
          */
          fAngleDiff =
CProcess::CircletToAngle((BYTE)ABS(iCircletDiff));
          /*
          **    Set Angle Difference Sign
          */
          if (iCircletDiff < 0)
            fAngleDiff = -fAngleDiff;
        }
        /*
        **    Calculate Orientation
        */
        if ((iOrientation = iCircletDiff) < 0)
          iOrientation += 256;
        /*
        **    Adjust Orientation for Zero
        */
        if (iOrientation == 0)
          iOrientation = 1;
        /*
```

APPENDIX B-continued

PSEUDOCODE FOR CALCULATING CONSISTENCY SCORES FOR EDGELS AND PATTERN GENERATION

```
    **  Verify
    */
    ASSERT((iOrientation >= 1) && (iOrientation <= 255));
    /*
    **  Calculate Sine and Cosine
    */
    fSin = sin(fAngleDiff * DEGSTORADS);
    fCos = cos(fAngleDiff * DEGSTORADS);
    /*
    **  Rotate Offset to Pattern Center
    */
    fRX = fCos * iOffsetX - fSin * iOffsetY;
    fRY = fSin * iOffsetX + fCos * iOffsetY;
    /*
    **  Convert to Integer
    */
    iOffsetRX = ROUNDOFF(fRX);
    iOffsetRY = ROUNDOFF(fRY);
    /*
    **  Update Probe Offset Information
    */
    sPattern->sProbeGrps[ii].sProbeOffs[iCirclet].iOffsetRX =
    iOffsetRX;
    sPattern->sProbeGrps[ii].sProbeOffs[iCirclet].iOffsetRY =
    iOffsetRY;
    sPattern->sProbeGrps[ii].sProbeOffs[iCirclet].uOrientation =
    (BYTE)iOrientation;
    /*
    **  Initialize Orientation Probe Set Extents
    */
    rExtents.left   = MAXLONG;
    rExtents.top    = MAXLONG;
    rExtents.right  = MINLONG;
    rExtents.bottom = MINLONG;
    /*
    **  Loop Through the Pattern Probes
    */
    for (jj = o ; jj < iPatternProbes ; jj++)
    {
        /*
        **  Rotate Base Probe Offset
        */
        fRX = fCos * sProbes[jj].iX - fSin * sProbes[jj].iY;
        fRY = fSin * sProbes[jj].iX + fCos * sProbes[jj].iY;
        /*
        **  Calculate and Store Offset
        */
        sProbeSet->sProbes[jj].iX = (short)(ROUNDOFF(fRX) +
        iOffsetRX);
        sProbeSet->sProbes[jj].iY = (short)(ROUNDOFF(fRY) +
        iOffsetRY);
        /*
        **  Update Extents
        */
        rExtents.left   = MIN(rExtents.left, sProbeSet->sProbes[jj].iX);
        rExtents.top    = MIN(rExtents.top, sProbeSet->sProbes[jj].iY);
        rExtents.right  = MAX(rExtents.right, sProbeSet->sProbes[jj].iX);
        rExtents.bottom = MAX(rExtents.bottom,
        sProbeSet->sProbes[jj].iY);
        /*
        **  Offset Base Probe Circlet
        */
        iProbeCirclet = sProbes[jj].uCirclet + iCircletDiff;
        /*
        **  Normalize Circlet
        */
        if (iProbeCirclet < o)
            iProbeCirclet += 256;
        else if (iProbeCirclet > 255)
            iProbeCirclet -= 256;
        /*
        **  Adjust for Zero
        */
        if (iProbeCirclet == o)
            iProbeCirclet = 1;
        /*
        **  Verify
        */
        ASSERT((iProbeCirclet >= 1) && (iProbeCirclet <= 255));
        /*
        **  Store Adjusted Circlet
        */
        sProbeSet->sProbes[jj].uCirclet = (BYTE)iProbeCirclet;
    }
    /*
    **  Save Probe Extents
    */
    sProbeSet->rExtents = rExtents;
    }
}
////////////////////////////////////////////////////////////////////
//
//  Finish
//
////////////////////////////////////////////////////////////////////
/*
**  Save Generation Information
*/
sPattern->iProbeGroups  = iProbeGroups;
sPattern->iRoughProbes  = iRoughProbes;
sPattern->iPatternProbes = iPatternProbes;
/*
**  Set Pattern Generated Flag
*/
sPattern->bGenerated = TRUE;
/*
**  Free Edgel Pool
*/
SysFree(iEdgelPool);
/*
**  Return Success
*/
return(SUCCESS);
}
```

APPENDIX C

PSEUDOCODE FOR CALCULATING SIGNED AND UNSIGNED MINIMUM CIRCLET DIFFERENCES

```
BOOL    CProcess::m_bLutCircletDiff = FALSE;
BYTE    CProcess::m_uLutCircletDiff[65536];
signed char CProcess::m_iLutCircletDiff[65536];
// CalcLutCircletDiff
//
// Calculate two 8-Bit Look-Up Tables which calculate the unsigned and
// signed difference between two input circlets (1 - 255).
//
// Valid unsigned circlet differences range from between 0 and 127
// inclusive. The value supplied by < iUndefinedDifference > is used
// when either circlet (first or second) is 0.
//
void    CProcess::CalcLutCircletDiff(long iUndefinedDifference)
{
long    c0, c1;
long    iCircletDiff;
/*
**  Check for Circlet Difference LUT Already Calculated
*/
if (m_bLutCircletDiff)
    return;
/*
**  Loop Through the Circlet Range
*/
for (c0 = 0 ; c0 < 256 ; c0++)
{
    /*
    **  Loop Through the Circlet Range
    */
```

APPENDIX C-continued

PSEUDOCODE FOR CALCULATING SIGNED AND UNSIGNED MINIMUM CIRCLET DIFFERENCES

```
for (c1 = 0 ; c1 < 256 ; c1++)
{
    /*
    ** Check for Either Circlet Zero
    */
    if ((c0 == 0) || (c1 == 0))
    {
        /*
        ** Either Circlet Zero
        ** Set Difference
        */
        iCircletDiff = iUndefinedDifference;
    }
    else
    {
        /*
        ** Neither Input Circlet Zero
        ** Calculate Circlet Difference
        */
        iCircletDiff = c0 – c1;
        /*
        ** Normalize the Circlet Difference
        */
        if (iCircletDiff > 127)
            iCircletDiff -= 255;
        if (iCircletDiff < -127)
            iCircletDiff += 255;
        /*
        ** Verify Difference
        */
        ASSERT((iCircletDiff >= -127) && (iCircletDiff <= 127));
    }
    /*
    ** Store
    */
    m_uLutCircletDiff[(c0 << 8) + c1] =   (BYTE)ABS(iCircletDiff);
    m_iLutCircletDiff[(c0 << 8) + c1] = (signed char)  iCircletDiff;
}
}
/*
** Set to LUT Calculated
*/
m_bLutCircletDiff = TRUE;
}
```

APPENDIX D

PSEUDOCODE FOR FIXED-ROTATION CORRELATION (FIRST EMBODIMENT)

```
struct sidPROBE     // Probe Structure Illustrative Definition
{
long    iOffsetX;        // Probe X-Axis Offset From Origin
long    iOffsetY;        // Probe Y-Axis Offset From Origin
unsigned char uCirclet;  // Probe Circlet Value
};
struct sidPROBESET   // Probe Set Structure Illustrative Definition
{
long    iNumProbes;      // Number of Probes
sidPROBE  sProbes[1000]; // Fixed Size Array of Probes
};
struct sidPATTERN    // Pattern Structure Illustrative Definition
{
long    iNumProbeSets;   // Number of Probe Sets
sidPROBESET  sProbeSets[100]; // Fixed Size Array of Probe Sets
};
extern long     m_iTargetImageRows;
extern long     m_iTargetImageCols;
extern unsigned char  m_uTargetCircletImage[1024][1024];
extern unsigned short m_uPrimaryProbeThreshold;
long            FixedRotationFindSingleBestMatchEntire
(
sidPROBESET     *sProbeSet,
long            iNumPrimaryProbes,
```

APPENDIX D-continued

PSEUDOCODE FOR FIXED-ROTATION CORRELATION (FIRST EMBODIMENT)

```
long&           iBestCirLocX,
long&           iBestCirLocY
)
{
long            xx, yy, kk;
long            iCx, iCy;
long            iBestCirSum;
unsigned short  uCirSum;
unsigned short  uPrimaryThreshold;
unsigned short  uLutIndex;
unsigned char   uCirclet,
unsigned char   uCirDiff;
/*
** Initialize to Find Best Match
*/
iBestCirSum   = MAXLONG;
iBestCirLocX  = -1;
iBestCirLocY  = -1;
/*
** Never Use More Primary Probes Than Available Probes
*/
if (iNumPrimaryProbes > sProbeSet->iNumProbes)
    iNumPrimaryProbes = sProbeSet->iNumProbes;
/*
** Normalize Primary Probe Threshold By Specified Number of Primary Probes
*/
uPrimaryThreshold = (unsigned short)iNumPrimaryProbes *
m_uPrimaryProbeThreshold;
/*
** Loop Through the Target Circlet Image Rows
*/
for (yy = 0 ; yy < m_iTargetImageRows ; yy++)
{
    /*
    ** Loop Through the Target Circlet Image Columns
    */
    for (xx = 0 ; xx < m_iTargetImageCols ; xx++)
    {
        /*
        ** Initialize Circlet Difference Sum
        */
        uCirSum = 0;
        /*
        ** Loop Through the Specified Number of Primary Probes
        */
        for (kk = 0 ; kk < iNumPrimaryProbes ; kk++)
        {
            /*
            ** Calculate the Target Circlet Image Location
            */
            iCx = xx + sProbeSet->sProbes[kk].iOffsetX;
            iCy = yy + sProbeSet->sProbes[kk].iOffsetY;
            /*
            ** Check for Valid Target Circlet Image Location
            */
            if (
                (iCx >= 0)              &&
                (iCx < m_iTargetImageCols)   &&
                (iCy >= 0)              &&
                (iCy < m_iTargetImageRows)
            )
            {
                /*
                ** Valid Target Circlet Image Location
                ** Extract Corresponding Circlet Value
                */
                uCirclet = m_uTargetCircletImage[iCy][iCx];
            }
            else
            {
                /*
                ** Not Valid Target Circlet Image Location
                ** Set Corresponding Circlet Value to Undefined
                */
```

APPENDIX D-continued

PSEUDOCODE FOR FIXED-ROTATION CORRELATION (FIRST EMBODIMENT)

```
    uCirclet = 0;
  }
  /*
  ** Calculate Unsigned Minimum Circlet Difference LUT Index
  */
  uLutIndex = (sProbeSet->sProbes[kk].uCirclet << 8) + uCirclet;
  /*
  ** Extract Unsigned Minimum Circlet Difference
  */
  uCirDiff = CProcess::m_uLutCircletDiff[uLutIndex];
  /*
  ** Add Minimum Circlet Difference to Circlet Difference Sum
  */
  uCirSum += uCirDiff;
  }
  /*
  ** Check for Process Secondary Probes
  */
  if (uCirSum < uPrimaryThreshold)
  {
    /*
    ** Process Secondary Probes
    ** Loop Through the Secondary Probes (Remaining Probes)
    */
    for ( ; kk < sProbeSet->iNumProbes ; kk++)
    {
      /*
      ** Calculate the Target Circlet Image Location
      */
      iCx = xx + sProbeSet->sProbes[kk].iOffsetX;
      iCy = yy + sProbeSet->sProbes[kk].iOffsetY;
      /*
      ** Check for Valid Target Circlet Image Location
      */
      if (
        (iCx >= 0)                    &&
        (iCx < m_iTargetImageCols)    &&
        (iCy >= 0)                    &&
        (iCy < m_iTargetImageRows)
      )
      {
        /*
        ** Valid Target Circlet Image Location
        ** Extract Corresponding Circlet Value
        */
        uCirclet = m_uTargetCircletImage[iCy][iCx];
      }
      else
      {
        /*
        ** Not Valid Target Circlet Image Location
        ** Set Corresponding Circlet Value to Undefined
        */
        uCirclet = 0;
      }
      /*
      ** Calculate Unsigned Minimum Circlet Difference LUT Index
      */
      uLutIndex = (sProbeSet->sProbes[kk].uCirclet << 8) + uCirclet;
      /*
      ** Extract Unsigned Minimum Circlet Difference
      */
      uCirDiff = CProcess::m_uLutCircletDiff[uLutIndex];
      /*
      ** Add Minimum Circlet Difference to Circlet Difference Sum
      */
      uCirSum += uCirDiff;
    }
    /*
    ** Check for Best Circlet Difference Sum
    */
    if (uCirSum < iBestCirSum)
    {
      /*
      ** Best Circlet Difference Sum
      ** Save Value and Location
      */
      iBestCirSum  = uCirSum;
      iBestCirLocX = xx;
      iBestCirLocY = yy;
    }
  }
  }
  }
  /*
  ** Return Best Circlet Sum
  */
  return(iBestCirSum);
}
```

APPENDIX E

PSEUDOCODE FOR ROTATION-INDEPENDENT CORRELATION (SECOND EMBODIMENT)

```
struct sidPROBE    // Probe Structure Illustrative Definition
{
  long     iOffsetX;      // Probe X-Axis Offset From Origin
  long     iOffsetY;      // Probe Y-Axis Offset From Origin
  unsigned char uCirclet;        // Probe Circlet Value
};
struct sidPROBESET   // Probe Set Structure Illustrative Definition
{
  long     iNumProbes;     // Number of Probes
  sidPROBE    sProbes[1000];     // Fixed Size Array of Probes
};
struct sidPATTERN    // Pattern Structure Illustrative Definition
{
  long     iNumProbeSets;    // Number of Probe Sets
  sidPROBESET   sProbeSets[100];   // Fixed Size Array of Probe Sets
};
extern long     m_iTargetImageRows;
extern long     m_iTargetImageCols;
extern unsigned char  m_uTargetCircletImage[1024][1024];
extern unsigned short  m_uPrimaryProbeThreshold;
long     RotationIndependentFindSingleBestMatchEntire
(
sidPATTERN      *sPattern,
long&       iBestCirLocX,
long&       iBestCirLocY
)
{
  long     jj, kk;
  long     xx, yy;
  long     iCx, iCy;
  long     iRpC;
  long     iApoX, iApoY;
  long     iRpoX, iRpoY;
  long     iNumProbes;
  long     iBestCirSum;
  unsigned short   uCirSum;
  char     iCirDiff;
  double     fAngleDifference;
  double     fSin, fCos;
  double     fRpoX, fRpoY;
  unsigned short   uLutIndex;
  unsigned char   uCircletCL;
  unsigned char   uCirclet;
  unsigned char   uCirDiff;
  sidPROBE     *sProbes;
  /*
  ** Initialize to Find Best Match
  */
  iBestCirSum  = MAXLONG;
  iBestCirLocX = -1;
  iBestCirLocY = -1;
  /*
```

APPENDIX E-continued

PSEUDOCODE FOR ROTATION-INDEPENDENT CORRELATION
(SECOND EMBODIMENT)

```
**  Loop Through the Target Circlet Image Rows
*/
for (yy = 0 ; yy < m_iTargetImageRows ; yy++)
{
/*
**  Loop Through the Target Circlet Image Columns
*/
for (xx = 0 ; xx < m_iTargetImageCols ; xx++)
{
/*
**  Extract Current Correlation Location Circlet
*/
uCircletCL = m_uTargetCircletImage[yy][xx];
/*
**  Can Only Correlate Locations With Defined Circlet
**  Check Current Correlation Location Circlet Undefined
*/
if (uCircletCL == 0)
{
/*
**  Current Correlation Location Circlet Undefined
**  Advance To Next Correlation Location
*/
continue;
}
/*
**  Current Correlation Location Circlet Defined
**  Loop Through All Pattern Probe Sets
*/
for (jj = 0 ; jj < sPattern->iNumProbeSets ; jj++)
{
/*
**  Extract Local Copies For Selected Probe Set
*/
iNumProbes = sPattern->sProbeSets[jj].iNumProbes;
sProbes    = sPattern->sProbeSets[jj].sProbes;
/*
**  Calculate Signed Minimum Circlet Difference LUT Index
**  Between the Target Image Correlation Location Circlet
**  And the First Probe Circlet in Selected Probe Set
*/
uLutIndex = (sProbes[0].uCirclet << 8) + uCircletCL;
/*
**  Extract Signed Minimum Circlet Difference
*/
iCirDiff = CProcess::m_iLutCircletDiff[uLutIndex];
/*
**  Convert the Signed Circlet Difference to Degrees
*/
fAngleDifference = iCirDiff * 360.0 / 255.0;
/*
**  Calculate the Sine and Cosine of the Angle
*/
fSin = sin(fAngleDifference * DEGSTORADS);
fCos = cos(fAngleDifference * DEGSTORADS);
/*
**  Initialize Circlet Difference Sum
*/
uCirSum = 0;
/*
**  Loop Through All Probe Set Probes
*/
for (kk = 0 ; kk < iNumProbes ; kk++)
{
/*
**  Rotate the Probe Based On Signed Circlet Difference
**  Adjust Probe Circlet By Signed Circlet Difference
*/
iRpC = sProbes[kk].uCirclet + iCirDiff;
/*
**  Wrap Probe Circlet to Range From 1 to 255
*/
if (iRpC < 1)
    iRpC += 255;
else if (iRpC > 255)
    iRpC -= 255;
/*
**  Make the First Probe the Origin
**  Adjust Current Probe Offset By First Probe Offset
*/
iApoX = sProbes[kk].iOffsetX - sProbes[0].iOffsetX;
iApoY = sProbes[kk].iOffsetY - sProbes[0].iOffsetY;
/*
**  Calculate Rotated Probe Offsets X and Y
*/
fRpoX = fCos * iApoX - fSin * iApoY;
fRpoY = fSin * iApoX + fCos * iApoY;
/*
**  Convert Rotated Probe Offsets to Closest Integers
*/
iRpoX = ROUNDOFF(fRpoX);
iRpoY = ROUNDOFF(fRpoY);
/*
**  Calculate the Target Circlet Image Location
*/
iCx = xx + iRpoX;
iCy = yy + iRpoY;
/*
**  Check for Valid Target Circlet Image Location
*/
if (
    (iCx >= 0)               &&
    (iCx < m_iTargetImageCols)  &&
    (iCy >= 0)               &&
    (iCy < m_iTargetImageRows)
   )
{
/*
**  Valid Target Circlet Image Location
**  Extract Corresponding Circlet Value
*/
uCirclet = m_uTargetCircletImage[iCy][iCx];
}
else
{
/*
**  Not Valid Target Circlet Image Location
**  Set Corresponding Circlet Value to Undefined
*/
uCirclet = 0;
}
/*
**  Calculate Unsigned Minimum Circlet Difference LUT Index
*/
uLutIndex = ((unsigned char)iRpC << 8) + uCirclet;
/*
**  Extract Unsigned Minimum Circlet Difference
*/
uCirDiff = CProcess::m_uLutCircletDiff[uLutIndex];
/*
**  Add Minimum Circlet Difference to Circlet Difference Sum
*/
uCirSum += uCirDiff;
}
/*
**  Check for Best Circlet Difference Sum
*/
if (uCirSum < iBestCirSum)
{
/*
**  Best Circlet Difference Sum
**  Save Value and Location
*/
```

APPENDIX E-continued

PSEUDOCODE FOR ROTATION-INDEPENDENT CORRELATION (SECOND EMBODIMENT)

```
        iBestCirSum    = uCirSum;
        iBestCirLocX   = xx;
        iBestCirLocY   = yy;
        }
       }
      }
     }
    }
   }
/*
** Return Best Circlet Sum
*/
return(iBestCirSum);
}
```

APPENDIX F

PSEUDOCODE FOR CALCULATING GRADIENT TO CIRCLET LOOPUP TABLE

```
BOOL      CProcess::m_bLutCirclet = FALSE;
BYTE      CProcess::m_uLutCirclet[65536];
// CalcLutCirclet
//
// Calculates an 8-Bit Look-Up Table which translates X and Y gradient
// values to circlets.
//
// A circlet is an angle representation where 0 - 360 degrees is mapped to
// 1 - 255 circlets. Zero is reserved for undetermined circlet (Both X and
// Y gradients zero or below a threshold).
//
void      CProcess::CalcLutCirclet( )
{
long      we, ns;
double    fA;
BYTE      uC;
/*
** Check for Circlet LUT Already Calculated
*/
if (m_bLutCirclet)
  return;
/*
** Calculate the Circlet LUT
**
**    fAngle = atan2(Gy, Gx)
**    iCirclet = (long)((fAngle * 255.0) / 360.0) + 1
**
** Loop Through the West/East Gradient Values
*/
for (we = −128 ; we < 128 ; we++)
{
  /*
  ** Loop Through the North/South Gradient Values
  */
  for (ns = −128 ; ns < 128 ; ns++)
  {
    /*
    ** Calculate the Angle (−180 to 180 Degrees)
    */
    fA = atan2((double)ns, (double)we) * RADSTODEGS;
    /*
    ** Convert Angle to Circlet
    */
    uC = AngleToCirclet(fA);
    /*
    ** Verify
    */
    ASSERT((uC >= 1) && (uC <= 255));
    ASSERT(((we + CPROCESS_LutCircletOffset) << 8) + ns +
CPROCESS_LutCircletOffset >= 0);
    ASSERT(((we + CPROCESS_LutCircletOffset) << 8) + ns +
CPROCESS_LutCircletOffset <= 65535);
    /*
    ** Store
    */
    m_uLutCirclet[((we + CPROCESS_LutCircletOffset) << 8) + ns +
```

APPENDIX F-continued

PSEUDOCODE FOR CALCULATING GRADIENT TO CIRCLET LOOPUP TABLE

```
CPROCESS_LutCircletOffset] = uC;
  }
 }
/*
** Set Undetermined (Both Gradients 0)
*/
m_uLutCirclet[(CPROCESS_LutCircletOffset << 8) +
CPROCESS_LutCircletOffset] = 0;
/*
** Verify LUT
long      ii;
long      iTotal = 0;
long      iCounts[256];
ZeroMemory(iCounts, sizeof(iCounts));
for (ii = 0 ; ii < 65536 ; ii++)
  iCounts[m_uLutCirclet[ii]]++;
for (ii = 0 ; ii < 256 ; ii++)
  iTotal += iCounts[ii];
*/
/*
** Set to LUT Calculated
*/
m_bLutCirclet = TRUE;
}
```

I claim:

1. A method of correlating an image of a feature of interest, comprising:
    acquiring a first image of a feature of interest;
    generating a learned circlet image from the first image, wherein a circlet is defined as a compact angle representation expressing, at a given pixel comprised in the first image, the direction of change of pixel intensity;
    saving one or more sets of learned circlets corresponding to one or more selected probes;
    acquiring a second image of the feature of interest;
    generating a target circlet image from the second image; and
    correlating the learned circlet image and the target circlet image.

2. The method of claim 1, wherein generating a learned circlet image comprises determining an intensity gradient for each learned pixel.

3. The method of claim 1, wherein generating a learned circlet image comprises filtering the first image.

4. The method of claim 1, wherein a circlet is defined so as to express an angle in one byte of data.

5. The method of claim 1, wherein the step of generating a learned circlet image comprises calculating a circlet using the formula: $C_{learned} = \{\Theta_{learned} * 255/360\} + 1$, where $C_{learned}$ is the learned circlet value, and learned edge direction angle $\Theta_{learned} = \operatorname{atan} 2 (G_{learned-y}, G_{learned-x})$, where the angle is expressed in degrees and is defined to be a positive number.

6. The method of claim 1, wherein the step of generating a learned circlet image comprises using a lookup table to pre-calculate approximate circlet values.

7. The method of claim 6, wherein pre-calculating approximate circlet values comprises summing the directional components of a learned gradient.

8. The method of claim 1, wherein the step of generating a learned circlet image from the first image comprises the steps of:
    filtering the first image;
    generating a learned gradient image corresponding to the filtered first image; and
    generating a learned circlet image comprising edgels from the learned gradient image.

9. The method of claim 8, wherein generating a learned gradient image comprises applying the Sobel edge detection algorithm.

10. The method of claim 8, wherein generating a learned gradient image comprises calculating a learned gradient image.

11. The method of claim 8, wherein generating a learned gradient image comprises determining the learned gradient image using a pre-calculated lookup table.

12. The method of claim 11, wherein generating a learned gradient image comprises using a pre-calculated lookup table to find the sum of the absolute values of the directional components of the learned gradient.

13. The method of claim 1, wherein the step of saving one or more sets of learned circlets comprises the steps of:
   determining a learned non-maximum suppression image from the learned circlet image;
   determining one or more edgel chains from the learned non-maximum suppression image;
   selecting one or more primary probes from the edgels;
   determining a consistency score for one or more edgels;
   using the consistency scores, selecting one or more sets of secondary probes from the one or more learned edgels; and
   saving one or more sets of learned circlets corresponding to the selected probes.

14. The method of claim 13, wherein the step of determining one or more edgel chains comprises the steps of:
   thresholding at least one of the one or more edgel chains; and
   extracting at least one of the one or more edgel chains from the learned non-maximum suppression image.

15. The method of claim 13, wherein the consistency score is configured to reflect learned gradient magnitude and learned circlet consistency.

16. The method of claim 13, wherein the step of determining a consistency score comprises:
   eliminating all edgels of a length less than a parameter $P_0$;
   for a selected edgel $E_1$, finding all edgels $E_2$ whose distance in edgels from $E_1$; is no more than a parameter $P_1$;
   calculating a consistency score by finding the edgel $E_2$ with the biggest difference in circlet value relative to $E_1$; and
   subtracting from 256 the absolute value of the circlet difference between $E_1$ and $E_2$ to determine the consistency score.

17. The method of claim 1, wherein the step of generating a target circlet image comprises the steps of:
   filtering the second image;
   generating a target gradient image corresponding to the second image; and
   generating a target circlet image comprising edgels from the target gradient image.

18. The method of claim 17, wherein generating a target gradient image comprises applying the Sobel edge detection algorithm.

19. The method of claim 1, wherein the step of correlating comprises the steps of:
   determining the absolute values of the differences between the learned circlet values corresponding to a selected primary probe and the target circlet values;
   determining the minimum circlet difference;
   determining the sums of the circlet differences;
   adding the minimum circlet difference to the circlet difference sums to generate a match quality parameter P for the primary probe;
   determining if the match quality parameter P is less than a previously saved match quality parameter threshold, and if no, returning to determining absolute values step for different selected primary probe;
   for at least one selected secondary probe, computing the sums $|\Delta C|_{sum}$ of the circlet differences $|\Delta C|$ between the secondary probe circlet values and the target circlet values;
   adding the circlet difference sums $|\Delta C|_{sum}$ for the selected primary and secondary probes to generate $|\Delta C|_{probes\ sum}$; and
   setting the calculated value of $|\Delta C|_{probes\ sum}$ equal to a best probes sum value $|\Delta C|_{best\ probes\ sum}$ and generating a correlated target circlet image using the current probe set if no previous $|\Delta C|_{best\ probes\ sum}$ was saved or if $|\Delta C|_{probes\ sum}$ is less than the previously saved $|\Delta C|_{best\ probes\ sum}$.

20. The method of claim 19, wherein the step of determining the absolute values of the circlet differences comprises using a lookup table to pre-calculate approximate absolute circlet difference values.

21. The method of claim 19, wherein the step of determining the minimum circlet difference comprises using a lookup table to pre-calculate an approximate minimum circlet difference value.

22. The method of claim 1, wherein the step of correlating comprises the steps of:
   selecting a set of one or more probes whose circlet values correspond to the target circlet values;
   selecting a primary probe from the set of one or more probes;
   determining the absolute values of the differences between the learned circlet values corresponding to the selected primary probe and the target circlet values;
   determining the minimum circlet difference;
   determining the sums of the circlet differences;
   adding the minimum circlet difference to the circlet difference sums to generate a match quality parameter P for the selected primary probe;
   determining if the match quality parameter P is less than a previously saved match quality parameter threshold, and if no, returning to determining absolute values step for different selected primary probe;
   for at least one selected secondary probe, computing the sums $|\Delta C|_{sum}$ of the circlet differences $|\Delta C|$ between the secondary probe circlet values and the target circlet values;
   adding the circlet difference sums $|\Delta C|_{sum}$ for the selected primary and secondary probes to generate $|\Delta C|_{probes\ sum}$; and
   setting the calculated value of $|\Delta C|_{probes\ sum}$ equal to a best probes sum value $|\Delta C|_{best\ probes\ sum}$ and generating a correlated target circlet image using the current probe set if no previous $|\Delta C|_{best\ probes\ sum}$ was saved or if $|\Delta C|_{probes\ sum}$ is less than the previously saved $|\Delta C|_{best\ probes\ sum}$.

23. The method of claim 22, wherein the step of determining the absolute values of the circlet differences comprises using a lookup table to pre-calculate approximate absolute circlet difference values.

24. The method of claim 22, wherein the step of determining the minimum circlet difference comprises using a lookup table to pre-calculate an approximate minimum circlet difference value.

25. A method of locating a feature of interest comprising the steps of:
- acquiring a first image of a feature of interest;
- filtering the first image;
- generating a learned gradient image corresponding to the filtered first image;
- generating a learned circlet image comprising edgels from the learned gradient image;
- determining a learned non-maximum suppression image from the learned circlet image;
- determining one or more edgel chains from the learned non-maximum suppression image;
- determining a consistency score for one or more of the learned edgels;
- using the consistency scores, selecting a set of primary probes from the one or more learned edgels;
- using the consistency scores, selecting a set of secondary probes from the one or more learned edgels;
- saving one or more sets of learned circlets corresponding to the selected probes;
- selecting alternate primary probes;
- acquiring a second image of the feature of interest;
- filtering the second image;
- generating a target gradient image corresponding to the filtered second image;
- generating a target circlet image from the target gradient image; and
- correlating the learned circlet image and the target circlet image.

* * * * *